US011865058B2

(12) United States Patent
Paul et al.

(10) Patent No.: US 11,865,058 B2
(45) Date of Patent: Jan. 9, 2024

(54) FLUID SOURCE FOR SUPPLYING FLUID TO THERAPY DEVICES

(71) Applicant: Stryker Corporation, Kalamazoo, MI (US)

(72) Inventors: Jason Michael Paul, Kalamazoo, MI (US); Seyed Behrad Ghodsi, Paw Paw, MI (US); Bradley Sommer, Lagrange, OH (US)

(73) Assignee: Stryker Corporation, Kalamazoo, MI (US)

( * ) Notice: Subject to any disclaimer, the term of this patent is extended or adjusted under 35 U.S.C. 154(b) by 78 days.

(21) Appl. No.: 18/083,872

(22) Filed: Dec. 19, 2022

(65) Prior Publication Data

US 2023/0120535 A1 Apr. 20, 2023

Related U.S. Application Data

(62) Division of application No. 16/668,894, filed on Oct. 30, 2019, now Pat. No. 11,559,451.
(Continued)

(51) Int. Cl.
*A61G 7/057* (2006.01)
*A47C 27/08* (2006.01)
*A61G 7/05* (2006.01)

(52) U.S. Cl.
CPC ........ *A61G 7/05769* (2013.01); *A47C 27/082* (2013.01); *A61G 7/0503* (2013.01); *A61G 2203/16* (2013.01)

(58) Field of Classification Search
CPC ............ A61G 7/05769; A61G 7/05776; A61G 7/057; A61G 2203/16; A61G 7/0503;
(Continued)

(56) References Cited

U.S. PATENT DOCUMENTS

| | | | |
|---|---|---|---|
| 4,665,573 | A | 5/1987 | Fiore |
| 4,947,500 | A | 8/1990 | Seiler |

(Continued)

FOREIGN PATENT DOCUMENTS

| | | | |
|---|---|---|---|
| GB | 2405582 | A | 3/2005 |
| WO | 95007679 | A2 | 3/1995 |

(Continued)

OTHER PUBLICATIONS

Stryker Medical, "Isolibrium Support Surface Specification Sheet", Rev. E.4, Nov. 2013, 2 pages.

(Continued)

*Primary Examiner* — Robert G Santos
(74) *Attorney, Agent, or Firm* — Howard & Howard Attorneys PLLC

(57) ABSTRACT

A fluid source comprises a connector assembly for connecting a fluid supply device to either a first therapy device or to a second therapy device. A controller automatically provides a first configuration of a user interface associated with a first therapy when a supply connector is operatively coupled to the first therapy device and provides a second configuration of the user interface associated with a second therapy, different than the first configuration, when the supply connector is operatively coupled to the second therapy device. A hanger assembly is provided to hang the fluid source on different support structures. The fluid source also comprises a housing with a watershed region to shed liquid away from the user interface.

7 Claims, 20 Drawing Sheets

Related U.S. Application Data

(60) Provisional application No. 62/753,312, filed on Oct. 31, 2018.

(58) Field of Classification Search
CPC ........ A61G 7/05; A47C 27/08; A47C 27/081; A47C 27/082; A47C 27/083; A47C 27/10
USPC ........ 5/615, 713, 714, 710, 706, 655.3, 654, 5/644, 658, 503.1
See application file for complete search history.

(56) References Cited

U.S. PATENT DOCUMENTS

| | | | | |
|---|---|---|---|---|
| 5,007,124 | A | 4/1991 | Raburn et al. | |
| 5,135,191 | A * | 8/1992 | Schmuhl | F16M 11/28 248/129 |
| 5,179,742 | A | 1/1993 | Oberle | |
| 5,319,816 | A * | 6/1994 | Ruehl | A61G 7/0509 5/600 |
| 5,617,595 | A | 4/1997 | Landi et al. | |
| 5,630,238 | A | 5/1997 | Weismiller et al. | |
| 5,794,289 | A | 8/1998 | Wortman et al. | |
| 6,115,861 | A | 9/2000 | Reeder et al. | |
| 6,367,106 | B1 | 4/2002 | Gronsman | |
| 6,387,065 | B1 | 5/2002 | Tumey | |
| 6,585,206 | B2 * | 7/2003 | Metz | A61G 7/0503 248/125.7 |
| 6,701,556 | B2 | 3/2004 | Romano et al. | |
| 6,735,799 | B1 | 5/2004 | Ellis et al. | |
| 6,829,796 | B2 | 12/2004 | Salvatini et al. | |
| 6,966,086 | B2 * | 11/2005 | Metz | A61G 12/008 5/503.1 |
| 7,641,623 | B2 | 1/2010 | Biondo et al. | |
| 7,666,341 | B2 | 2/2010 | Pearce | |
| 7,886,386 | B2 | 2/2011 | Balonick et al. | |
| 7,904,976 | B2 | 3/2011 | Hakamiun et al. | |
| 7,914,611 | B2 | 3/2011 | Vrzalik et al. | |
| 8,069,514 | B2 | 12/2011 | Poulos et al. | |
| 8,108,957 | B2 | 2/2012 | Richards et al. | |
| 8,117,701 | B2 | 2/2012 | Bobey et al. | |
| 8,118,920 | B2 | 2/2012 | Vrzalik et al. | |
| 8,372,182 | B2 | 2/2013 | Vrzalik et al. | |
| 8,490,233 | B2 | 7/2013 | Essers | |
| 8,584,279 | B2 | 11/2013 | Richards et al. | |
| 8,845,562 | B2 | 9/2014 | Receveur et al. | |
| 8,918,930 | B2 | 12/2014 | Stroh et al. | |
| 9,044,368 | B2 | 6/2015 | Fairburn et al. | |
| 9,095,224 | B2 | 8/2015 | Tanaka et al. | |
| 9,114,048 | B2 | 8/2015 | Takeda et al. | |
| 9,192,533 | B2 | 11/2015 | Fairburn et al. | |
| 9,254,231 | B2 | 2/2016 | Vrzalik et al. | |
| 9,326,904 | B2 | 5/2016 | Nomura et al. | |
| 9,597,244 | B2 | 3/2017 | Ishibashi et al. | |
| 9,622,589 | B2 | 4/2017 | Nomura et al. | |
| 9,835,344 | B2 | 12/2017 | Vrzalik et al. | |
| 9,867,748 | B2 | 1/2018 | Takeda et al. | |
| 10,463,165 | B2 | 11/2019 | Ishibashi et al. | |
| 10,980,352 | B2 | 4/2021 | Ishibashi et al. | |
| 11,559,451 | B2 * | 1/2023 | Paul | A47C 27/082 |
| 2002/0047075 | A1 * | 4/2002 | Metz | A61G 12/008 211/113 |
| 2003/0230687 | A1 * | 12/2003 | Metz | A61G 7/0503 5/503.1 |
| 2008/0040860 | A1 | 2/2008 | Price et al. | |
| 2009/0013470 | A1 | 1/2009 | Richards et al. | |
| 2010/0076356 | A1 | 3/2010 | Biondo et al. | |
| 2010/0212087 | A1 | 8/2010 | Leib et al. | |
| 2011/0163885 | A1 | 7/2011 | Poulos et al. | |
| 2012/0016281 | A1 | 1/2012 | Richards et al. | |
| 2012/0022414 | A1 | 1/2012 | Receveur et al. | |
| 2012/0291204 | A1 | 11/2012 | Takeda et al. | |
| 2012/0304385 | A1 | 12/2012 | Ishibashi et al. | |
| 2012/0311790 | A1 | 12/2012 | Nomura et al. | |
| 2013/0014324 | A1 | 1/2013 | Receveur et al. | |
| 2013/0231596 | A1 | 9/2013 | Hornbach et al. | |
| 2014/0031730 | A1 | 1/2014 | Hornbach et al. | |
| 2015/0040326 | A1 | 2/2015 | Fairburn et al. | |
| 2015/0257955 | A1 | 9/2015 | Fairburn et al. | |
| 2016/0008198 | A1 | 1/2016 | Takeda et al. | |
| 2016/0038362 | A1 | 2/2016 | Fairburn et al. | |
| 2016/0157627 | A1 | 6/2016 | Nomura et al. | |
| 2017/0027791 | A1 | 2/2017 | McKnight et al. | |
| 2017/0095090 | A1 | 4/2017 | Ishibashi et al. | |
| 2017/0254379 | A1 | 9/2017 | Whatcott | |
| 2019/0320809 | A1 | 10/2019 | Ishibashi et al. | |
| 2020/0129352 | A1 | 4/2020 | Paul et al. | |

FOREIGN PATENT DOCUMENTS

| | | | | |
|---|---|---|---|---|
| WO | WO-0193795 | A2 * | 12/2001 | A61G 12/008 |
| WO | 2013086197 | A1 | 6/2013 | |

OTHER PUBLICATIONS

Stryker Medical, "Isolibrium Support Surface Version 4.0, Ref 2971, Ref 2972 Maintenance Manual", Rev. B, May 2017, 88 pages.
Stryker Medical, "Isolibrium Support Surface Version 4.0, Ref 2971, Ref 2972 Maintenance Manual", Rev. C, May 2017, 88 pages.
Stryker Medical, "Isolibrium Support Surface Version 4.0, Ref 2971, Ref 2972 Maintenance Manual", Rev. C.2, Jul. 2017, 88 pages.
Stryker Medical, "Mattress Assembly Page—2235-100-001—Bariatric Bed Model 2230", Rev. A, 2 pages.
Stryker Medical, "P100/Sof Care Pump Ref 2880, Ref 2890 Service Manual", Oct. 2017, 8 pages.
Stryker Medical, "Position Pro Therapy Mattress Model 2920 Operations/Mainentance Manual", Rev. A, Feb. 2007, 55 pages.
Stryker Medical, "PositionPro Patient Repositioning Support Surface-Standalone with Pendant or Integrated with FL27 In Touch CC Model Beds Ref 2920 Maintenance Manual", Rev. A, Oct. 2016, 56 pages.
Stryker Medical, "PositionPro Patient Repositioning Support Surface-Standalone with Pendant or Integrated with FL27 In Touch CC Model Beds Ref 2920 Maintenance Manual", Rev. G, Oct. 2016, 42 pages.
Stryker Medical, "Pressure Management—Dynamic Mattress System 2500 Operations/Maintenance Manual", Aug. 1994, 17 pages.
Stryker Medical, "Pressure Management—Dynamic Mattress System 2500 Operations/Maintenance Manual", Aug. 1997, 23 pages.
Stryker Medical, "ProForm Non-Powered Support Surface Model 2710 Operations/Maintenance Manual", Rev. G, Sep. 14, 2015, 134 pages.
Stryker Medical, "Save Simply Brochure", 2018, 2 pages.
Stryker Medical, "Sof Care Chair Cushion Ref 2770-100-000 Operations Manual", Rev. D, Apr. 2016, 1 page.
Stryker Medical, "Sof Care DuoGard Overlay Brochure", 2015, 3 pages.
Stryker Medical, "SofCare Healthcare Boot, Ref 2760-100-000, Ref 2760-200-000, Ref 2760-300-000 Operations Manual", Rev. C, Mar. 2016, 2 pages.
Stryker Medical, "SofCare HeelCare Boot Series Specification Sheet", Rev. B.3, Aug. 2011, 2 pages.
Stryker Medical, SofCare Stretcher Overlay Ref 2780-400-000, Ref 2780-500-000 Operations Manual, Rev. B, Dec. 2014, 2 pages.
Stryker Medical, "SPR Plus Low Air Loss Overlay 3-Layer Technology Specification Sheet", Rev. D.2, Aug. 2011, 2 pages.
Stryker Medical, "SPR Plus Overlay Ref 2790-100-000 Operations Manual", Rev. B, Dec. 2014, 2 pages.
Stryker Medical, "Stryker Air I, Stryker Air II Low Air Loss Therapy Mattress (LAL), Model 2236 Operations/Maintenance Manual", Rev. B, May 2009, 30 pages.
Stryker Medical, "Stryker Air Pump Ref 2861 Service Manual", Rev. 2.0, Jun. 2016, 58 pages.
Stryker Medical, "Ultra Comfort SE Support Surface Ref. 1703; Ref. 1704 Operations Manual", Rev. D, May 2017, 40 pages.
Stryker Medical, "XPRT Pulmonary Therapy & Wound Care Mattress Model 2950 Operations/Maintenance Manual", Rev. C, Aug. 2007, 114 pages.

(56) References Cited

OTHER PUBLICATIONS

Stryker Medical, "XPRT Therapeutic Support Surface Ref 2950 Operations/Maintenance Manual", Rev. B, Jun. 2012, 468 pages.
Stryker Medical, XPRT Therapy Mattress Model 2950 Operations Manual, Rev. A, Jul. 2006, 98 pages.
Stryker Medical, "XPRT Therapy Mattress Model 2950 Operations/Maintenance Manual", Rev. A, May 2006, 98 pages.
Stryker Medical, "XPRT Therapy Mattress Model 2950 Operations/Maintenance Manual", Rev. H, Jun. 2006, 98 pages.
Stryker Medical, "DuoGard Overlay Ref 2780-300-000 Operations Manual", Rev. B, Dec. 2014, 1 page.
Gaymar Industries Inc., "Air Express Alternating Low Pressure Therapy Operator's Manual", Apr. 2014, 113 pages.
Gaymar Industries Inc., "Air Express C1000DF Service Manual", Jul. 2007, 16 pages.
Gaymar Industries Inc., "Air Express LAL P1500 Low Air Loss Therapy System Operator's Manual", Rev. B, Apr. 2010, 32 pages.
Gaymar Industries Inc., "Aire Twin Alternating Pressure and Low-Loss Therapy Mattress Replacement Systems ATC80, ATM500, ATM800, ATW5000, ATW8000 Operator's Manual", May 2005, 8 pages.
Gaymar Industries Inc., "Auto Aire Select Dynamic Low-Air Loss Therapy Service Manual", Rev. A, Apr. 2010, 28 pages.
Gaymar Industries Inc., Auto Aire Select Dynamic Low-Air Loss Therapy With Alternating Pressure and Active Sensor Technology Ref C2500MES Control Unit, Ref M2500S Series Mattress, Ref X3580S Operator's Manual Rev. B, Sep. 2010, 42 pages.
Gaymar Industries Inc., "Auto Aire Select Dynamic Low-Air Loss Therapy With Alternating Pressure and Active Sensor Technology Ref C2500MS Control Unit, Ref M2500S Series Mattress, Ref Auto Aire Select Safety Mattress Service Manual", Rev. B, Sep. 2010, 14 pages.
Gaymar Industries Inc., "Auto Sure-Float Ref C1000MS/C1000MES Control Unit; Ref M1001S/M1002S Series Mattress Operator's Manual", Rev. B, Sep. 2010, 128 pages.
Gaymar Industries Inc., "Clini-Dyne Lateral Rotation System CLP2000 Control Unit, CLM Series Mattress Service Manual", Rev. A, Oct. 2010, 18 pages.
Gaymar Industries Inc., "Clini-Dyne Rotational Therapy System CLP2000 Control Unit, CLM Series Mattress Operator's Manual", Rev. A, Oct. 2010, 8 pages.
Gaymar Industries Inc., "EFF302 Alternating Pad Instructions", Rev. A, Jan. 2010, 1 page.
Gaymar Industries Inc., "Instructions for Use Sof Care Mattress Series", Rev. A, May 2010, 12 pages.
Gaymar Industries Inc., "O2 Zoned Multi-Functional Portable Rotation System P4000, P4001, C4000 Series Control Unit, M4000 Series Mattress Operator's Manual", Rev. B, Oct. 2010, 12 pages.
Gaymar Industries Inc., "Paradise Pump PAR 30 Config F Alternating Pressure Pump Functional Check Instructions", Rev. A, Apr. 2007, 1 page.
Gaymar Industries Inc., "Paradise Pump Series Operator's Manual", Sep. 2005, 8 pages.
Gaymar Industries Inc., "Plexus O2 Zoned Multi-Functional Portable Rotation System C4000 Series Control Unit, M4000 or M4001 Series Mattress Service Manual", Rev. A, Oct. 2010, 40 pages.
Gaymar Industries Inc., "Plexus Ref P102 Plexus Jr. Alternating Pressure System, Ref C102 Plexus Jr. APM Control Unit, Ref M100 Alternating Pressure Mattress Overlay Instructions for Use", Rev. C, Apr. 2012, 20 pages.
Gaymar Industries Inc., "Pressure Pedic Pressure Redistribution Mattress Instructions for Use", Rev. B, Dec. 2009, 2 pages.
Gaymar Industries Inc., "SC505 Sof Care Inflator Operating Instructions and Service Manual", Rev. C, Oct. 2010, 8 pages.
Gaymar Industries Inc., "Sof Care Bed Cushions Instructions for Use", Sep. 1993, 2 pages.
Gaymar Industries Inc., "Sof Matt Low Air Loss Mattress System Operator's Manual/Service Manual", Oct. 2010, 40 pages.
Gaymar Industries Inc., "Symmetric Aire Mattress Ref SYM3000 Series Instructions for Use", Apr. 2012, 3 pages.
Gaymar Industries, "Symmetric Aire Mattress Ref SYM3000 Series Service Document", Rev. A, Jun. 2010, 2 pages.
Plexus Medical, "O2 Zoned C4000 Portable Rotation System; CareMedx C5000 Multi-Zoned Low Air Loss Therapy System Service Manual", published at least prior to Sep. 2018, 58 pages.
Plexus Medical, "Plexus C1000D Series Control Unit Service Manual", published at least prior to Sep. 2018, 20 pages.
Plexus Medical, "Plexus P1500 Air Express LAL System Service Manual", published at least prior to Sep. 2018, 17 pages.
Sage Products, "Pressure Injury and Safe Patient Handling Solutions—Prevalon Mobile Air Transfer Systems; Prevalon Turn & Position Systems; Prevalon Heel Protectors; Prevalon Seated Positioning System Brochure", 2017, 20 pages.
Sage Products, "Prevalon Air Pump Brochure", 2017, 1 page.
Sage Products, "Prevalon AirTap Patient Repositioning System Operator's Manual", 2016, 10 pages.
Sage Products, "Prevalon AirTap XXL Patient Repositioning System Brochure", 2018, 4 pages.
Sage Products, "Prevalon Standard Turn and Position System Instructions for Use", 2016, 1 page.
Sage Products, "Prevalon Turn and Position System 2.0 Instructions for Use", 2016, 1 page.
Sage Products, "Sage Product Catalog—Pressure Injury Prevention and Safe Patient Handling", 2018, 4 pages.
Stryker Medical, "Arise 1000 EX Low Air-Loss Bariatric Surface Specification Sheet", Rev. B, 2008, 2 pages.
Stryker Medical, "Arise 1000EX Low Air Loss Therapy Mattress Model 2236 Operations/Maintenance Manual", Rev. B, May 2009, 30 pages.
Stryker Medical, "ComfortGel SE Support Surface Ref 1805 Operations Manual", Rev. C, Sep. 2016, 18 pages.
Stryker Medical, "ComfortGel Support Surface Ref 2850 Operations Manual", Rev. A, Aug. 2017, 22 pages.
Stryker Medical, "ComfortGel Support Surface Specification Sheet", Rev. E.6, Dec. 2011, 2 pages.
Stryker Medical, "EOLE / EOLE DC Pump Ref 2870, Ref 2871 Service Manual", Oct. 2017, 16 pages.
Stryker Medical, "EOLE DC Powered Support Surface Ref 2871 Operations/Maintenance Manual", Dec. 2017, 288 pages.
Stryker Medical, "EOLE Powered Support Surface Ref 2870 Operations/Maintenance Manual", Dec. 2017, 288 pages.
Stryker Medical, "IsoAir Ref 2940 Service Manual", Rev. 1.0, Nov. 2016, 144 pages.
Stryker Medical, "IsoFlex LAL Support Surface Ref 2860 Operations/Maintenance Manual", Rev. C, Aug. 2017, 28 pages.
Stryker Medical, "IsoFlex LAL Support Surface Specification Sheet", Rev. D.3, 2016, 2 pages.
Stryker Medical, "Isoflex Pressure Management Mattress Instructions for Use", Rev. A, Jun. 2010, 2 pages.
Stryker Medical, "IsoFlex SE Support Surface Ref 1806 Operations Manual", Rev. C, Sep. 2016, 20 pages.
Stryker Medical, "IsoGel AIR Support Surface Ref 2860 Operations Manual", Rev. F, May 2015, 25 pages.
Stryker Medical, "IsoGel Support Surface Dimensional Gel Technology Specification Sheet", Dec. 2013, 2 pages.
Stryker Medical, "Isolibrium Support Surface Ref 2971 Operations/Maintenance Manual", Rev. B, Oct. 2014, 202 pages.
Stryker Medical, "Isolibrium Support Surface Ref 2971 Operations/Maintenance Manual", Rev. C, May 2014, 200 pages.

* cited by examiner

FLUID SOURCE FOR SUPPLYING FLUID TO THERAPY DEVICES

CROSS-REFERENCE TO RELATED APPLICATIONS

The subject patent application is a Divisional of U.S. patent application Ser. No. 16/668,894 filed on Oct. 30, 2019, which claims priority to and all the benefits of U.S. Provisional Patent Application No. 62/753,312 filed on Oct. 31, 2018, the disclosures of each of which are hereby incorporated by reference in their entirety.

BACKGROUND

Fluid sources comprising pumps, fans, and/or blowers, are known for supplying fluid to therapy devices, such as patient supports, e.g., mattresses. Often the patient support is configured to provide one or more types of therapy to a patient. For instance, the patient support may be configured to provide low air loss therapy and/or turn assist therapy to the patient to reduce the risk of pressure sores/ulcers. Accordingly, the fluid source is used to supply fluid, e.g., air, to the patient support to provide these therapies. The fluid source is programmed with the necessary software to drive a user interface to enable operation of the fluid source to provide these therapies. However, in some cases, one patient support may be configured to only provide low air loss therapy, while another patient support may be configured to provide both low air loss therapy and turn assist therapy. Accordingly, some functions of the user interface associated with the turn assist therapy may be unnecessary for certain patient supports. As a result, different fluid sources may be manufactured for the different patient supports, which may be inefficient and costly.

A typical fluid source comprises a housing having generally vertical walls and a hanger assembly comprising hooks that deploy from the housing to hang the fluid source on a support structure such as a footboard of a patient support apparatus, e.g., a hospital bed. However, such hanger assemblies are typically sized to accommodate the thickest footboard from which the fluid source is likely to be hanging. Accordingly, when the fluid source is instead hanging from a footboard of much smaller thickness, the fluid source tends to hang such that the vertical walls are not vertical, but instead hang askew. In this case, if a display, indicator light, or other visual component is located on one of the generally vertical walls, it may be difficult for a caregiver to see the display, indicator light, or other visual component.

The fluid source may comprise one or more indicator lights that indicate certain states of the fluid source, but these indicator lights are often not intuitive as to the particular state being indicated. Additionally, it may be difficult for a caregiver to remotely view the indicator lights to assess the state of the fluid source, such as by way of a glance into a patient's room.

The fluid source may encounter liquids, such as water, saline, etc., being spilled on the housing. Sometimes, however, the housing is not designed in a manner to easily shed such liquids to prevent damage to the housing and/or to the internal components.

A fluid source designed to address one or more of the aforementioned deficiencies is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
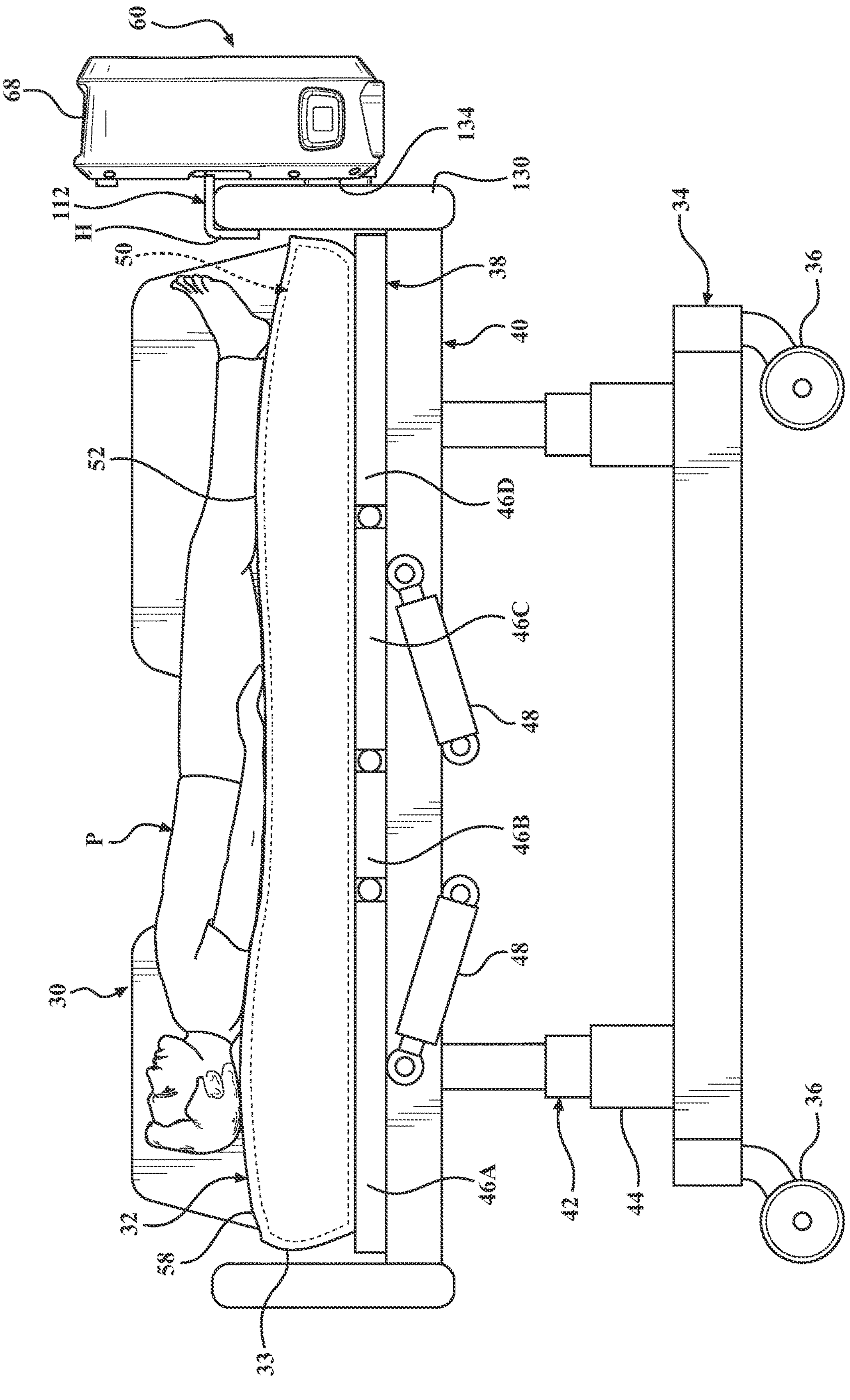
FIG. 1 is an elevational view of a patient support apparatus including a patient support and a fluid source.

FIG. 1 illustrates a patient support apparatus 30 including a patient support 32. The patient support apparatus 30 shown in FIG. 1 is a hospital bed, but alternatively may be a stretcher, cot, trolley, gurney, wheelchair, recliner, chair, table, or other suitable support or transport apparatus. The patient support apparatus 30 may include a base 34 having wheels 36 adapted to rest upon a floor surface, and a patient support deck 38 supported by the base 34.

The patient support apparatus 30 may include an intermediate frame 40 spaced above the base 34 with the patient support deck 38 coupled to or disposed on the intermediate frame 40. A lift device 42 may be operably coupled to the intermediate frame 40 and the base 34 for moving the patient support deck 38 relative to the base 34. In the exemplary embodiment illustrated in FIG. 1, the lift device 42 includes a pair of linear actuators 44, but other suitable constructions are contemplated. The illustrated embodiment also shows the patient support deck 38 including deck sections configured to articulate the patient support 32 between various configurations. The deck sections may include a fowler section 46A, a seat section 46B, a thigh section 46C, a leg section 46D, and the like, some of which are operably coupled to actuators 48. For example, the actuators 48 may move the fowler section 46A between a first position in which the patient P is supine, as illustrated in FIG. 1, and a second position in which the torso of the patient P is positioned at an incline. For another example, a gatch maneuver may be performed in which the positions of the thigh and/or leg sections 46C, 46D are articulated to impart flexion or extension to lower extremities of the patient.

The patient support 32 is supported on the patient support deck 38 of the patient support apparatus 30. The illustrated embodiment shows the patient support 32 as a mattress for supporting the patient P when positioned on the patient support apparatus 30. The patient support 32 includes a crib assembly 50 and a cover assembly 52 disposed over the crib assembly 50. In other words, the crib assembly 50 is disposed within the cover assembly 52. The patient support 32 defines a patient support surface 58 for supporting the patient P.

Figure 2:
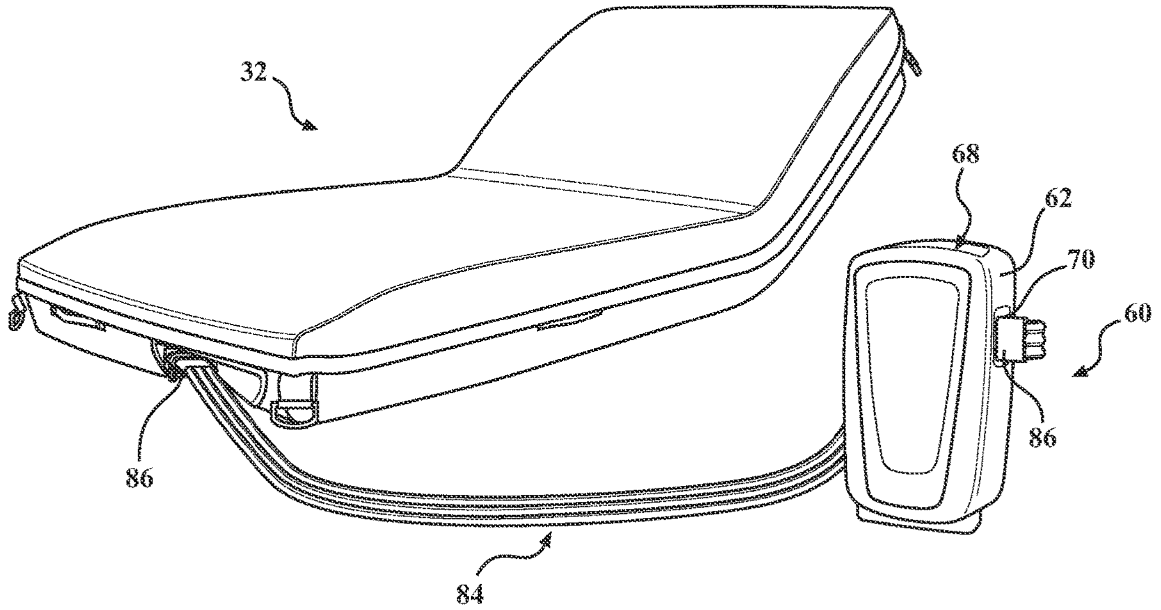
FIG. 2 is a perspective view of the fluid source coupled to the patient support to supply fluid to the patient support.
Figure 3:
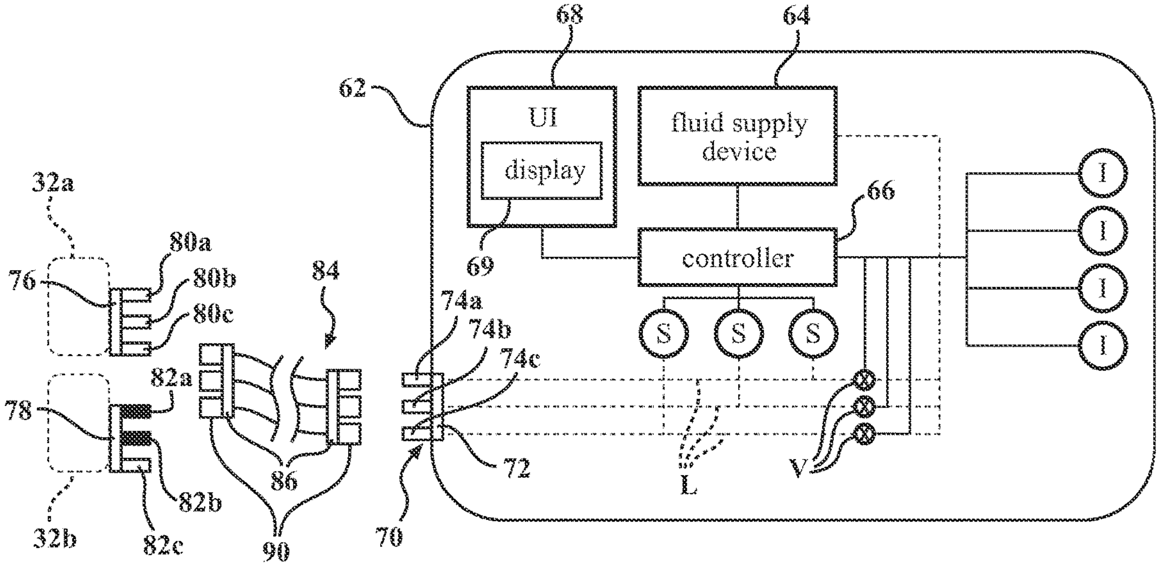
FIG. 3 is a schematic view of a control system of the fluid source and fluid routing.

Referring to FIGS. 2 and 3, a fluid source 60 is arranged to supply fluid (e.g., air, water, other liquids, etc.) to the patient support 32. The fluid source 60 comprises a housing 62 and a fluid supply device 64 disposed within the housing 62. The fluid supply device 64 may comprise a pump, fan, blower, or the like, and associated motor or motors, for supplying fluid to the patient support 32.

A controller 66 is operatively coupled to the fluid supply device 64 to control operation of the fluid supply device 64. The controller 66 may comprise one or more microprocessors for processing instructions or for processing algorithms stored in memory to control operation of the fluid supply device 64 to supply fluid to the patient support 32. Additionally or alternatively, the controller 66 may comprise one or more microcontrollers, field programmable gate arrays, systems on a chip, discrete circuitry, graphics drivers, and/or other suitable hardware, software, or firmware that is capable of carrying out the functions described herein. The controller 66 may be carried on-board the fluid source 60, or may be remotely located. In one embodiment, the controller 66 is disposed inside the housing 62. Power to the fluid supply device 64, the controller 66, and other electronic components of the fluid source 60 may be provided by a battery power supply or an external power source. For example, the fluid supply device 64 may comprise a DC switchable power supply so that in different geographic regions, the same fluid source 60 may be employed with a different power cord. In other words, the fluid source 60 may be plugged into any voltage and be operational.

A user interface 68 is operatively coupled to the controller 66 to enable a user, such as a caregiver, to provide input to operate the fluid supply device 64. The user interface 68 may comprise, for example, a touchscreen, push buttons, gesture sensors, piezoelectric elements, or the like to receive user input and generate corresponding input signals to be transmitted to the controller 66 to control operation of the fluid supply device 64 based on the input signals. The user interface 68 may further comprise a display 69 operatively coupled to the controller 66. The display 69 may be a light-emitting diode (LED) display, an electroluminescent display (ELD), a liquid crystal display (LCD), an organic light-emitting diode (OLED) display, or any other suitable display. The controller 66 generates and outputs graphical representations (e.g., images) of the various therapies, warnings, and the like on the display 69. These graphical representations may be stored as graphic information/images in memory of the controller 66 in any suitable format for being output onto the display 69 by the controller 66.

Figure 4:
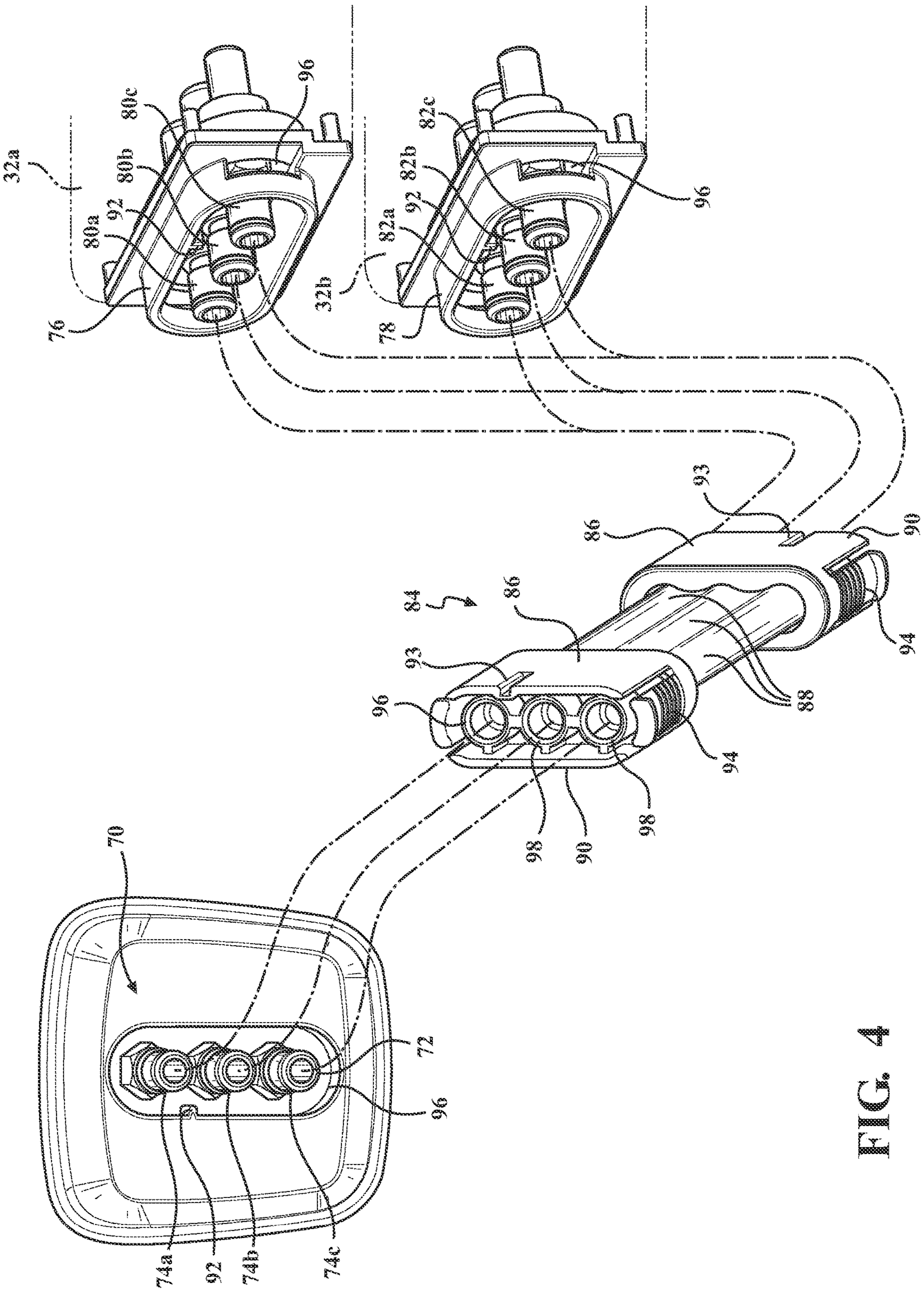
FIG. 4 is an illustration of a fluid supply line coupling a supply connector of the fluid source to either a first connector of a first patient support or a second connector of a second patient support.

Referring to FIGS. 3 and 4, a connector assembly 70 is operatively coupled to the housing 62 for connecting the fluid supply device 64 to one of a plurality of different therapy devices (e.g., different patient supports, compression sleeves, temperature management devices, or the like). The connector assembly 70 comprises a supply connector 72 with a plurality of supply ports 74*a*, 74*b*, 74*c*. The supply connector 72 is configured to be operatively coupled to one of a plurality of connectors of the therapy devices. In the embodiment shown in FIGS. 3 and 4, one of the therapy devices is a patient support 32*a*, which comprises a connector 76 and another of the therapy devices is a different patient support 32*b*, which comprises a connector 78. Each of the connectors 76, 78 comprise a plurality of ports 80*a*, 80*b*, 80*c* and 82*a*, 82*b*, 82*c*, respectively. The connectors 72, 76, 78 may be formed from any suitable material, such as a thermoplastic polymer or a blend of thermoplastic polymers. In one embodiment, the connectors 72, 76, 78 are formed from a polycarbonate/acrylonitrile butadiene styrene (PC/ABS).

A fluid supply line 84 operatively couples the supply connector 72 to either of the connectors 76, 78. The fluid supply line 84 comprises a pair of couplings 86 coupled together by a plurality of conduits 88. Each of the couplings 86 have a mating interface 90 shaped to attach to any of the supply connector 72, the connector 76, or the connector 78. The mating interface 90 is configured so that each of the couplings 86 attach to any of the supply connector 72, the connector 76, or the connector 78 in only a single orientation.

Referring to FIG. 4, the supply connector 72, the connector 76, and the connector 78 each comprise an alignment projection 92 configured to ensure that each of the couplings 86 attaches in only the single orientation. The alignment projection 92 is shaped to mate with a complimentary alignment groove 93 in the couplings 86. The alignment projection 92 extends inwardly from a peripheral wall of the connectors 72, 76, 78. The alignment projection 92 may be offset from a center of the connector 72, 76, 78. By being a single alignment projection 92 and/or being in an off-center location ensures that the coupling 86 is correctly aligned with the connector 72, 76, 78. The mating interface 90 of each coupling 86 further comprises a pair of snap-lock taps 94 shaped to releasably engage snap-lock pockets 96 in the connectors 72, 76, 78.

The outer diameter of the ports 74*a*-74*c*, 80*a*-80*c*, 82*a*-82*c* may be tapered to facilitate coupling the ports 74*a*-74*c*, 80*a*-80*c*, 82*a*-82*c* to corresponding receiver tubes 98 of the couplings 86. The receiver tubes 98 are shaped to receive and mate with the ports 74*a*-74*c*, 80*a*-80*c*, 82*a*-82*c*. The ports 74*a*-74*c*, 80*a*-80*c*, 82*a*-82*c* may further comprise a circumferential groove with O-ring for sealing the ports 74*a*-74*c*, 80*a*-80*c*, 82*a*-82*c* to the receiver tubes 98.

The connectors 76, 78 have different configurations depending on use, e.g., depending on which of a plurality of different therapies are provided by the associated patient support 32*a*, 32*b*. For example, if the patient support 32*a* employs a low air loss system to provide low air loss therapy and a turn assist system to provide turn assist therapy, then all three of the ports 80*a*, 80*b*, 80*c* may be available for routing fluid from the fluid supply device 64 of the fluid source 60 to the low air loss system (e.g., air tubes with openings for providing air flow through the patient support 32*a*) and the turn assist system (e.g., air bladders for turning the patient P). In other words, the connector 76 may be provided with all of the ports 80*a*, 80*b*, 80*c* being open to fluid communication between the fluid supply device 64 and the low air loss system and the turn assist system. Thus, all the plurality of supply ports 74*a*, 74*b*, 74*c* are utilized to provide fluid from the fluid supply device 64 to the patient support 32*a*. For example, the supply ports 74*a*, 74*b* may be arranged to provide fluid to the turn assist system (e.g., one port for each air bladder) and the supply port 74*c* may be configured to provide air to the low air loss system.

In some embodiments, however, the patient support 32*b* may only comprise a single system, e.g., only the low air loss system or only the turn assist system. In this case, all three ports 82*a*, 82*b*, 82*c* will not be needed. As a result, the connector 78 may be provided with one or two of the three ports 82*a*, 82*b*, 82*c* blocked from fluid communication. This could be accomplished by forming a wall in the ports to be blocked, placing a barrier in the ports to be blocked, molding the ports closed, or the like (see, e.g., the blockages illustrated in FIG. 3). Thus, not all the plurality of supply ports 74*a*, 74*b*, 74*c* are utilized to provide fluid from the fluid supply device 64 to the patient support 32*b*. For example, the supply ports 74*a*, 74*b* may not be utilized if there is no turn assist system in the patient support 32*b*, such that only the supply port 74*c* is used to provide air to the low air loss system.

As a result of the configuration of the supply connector 72 and the connectors 76, 78, the same fluid source 60 may be used for both configurations of patient supports 32*a*, 32*b*, without requiring different port configurations. In other words, instead of using a connector with three ports, a connector with two ports, and/or a connector with one port, a single connector type (e.g., with three ports) can be used for various different configurations of patient supports 32*a*, 32*b*.

The controller 66 is configured to automatically provide different configurations of the user interface 68 depending on which of the therapy devices is coupled to the fluid source 60, e.g., based on which of the plurality of therapies are available. For example, the controller 66 may be configured to automatically generate a first configuration 102*a* (see FIG. 20) of the user interface 68 associated with low air loss therapy and turn assist therapy when the supply connector 70 is operatively coupled to the connector 76 of the patient support 32*a* since the patient support 32*a* is able to provide both low air loss therapy and turn assist therapy. Conversely, the controller 66 may be configured to automatically generate a second configuration 102*b* (see FIG. 19) of the user interface 68 associated with only the low air loss therapy, when the supply connector 70 is operatively coupled to the connector 78 of the patient support 32*b*, since the patient support 32*b* is only capable of providing low air loss therapy and not turn assist therapy. In the first configuration of the user interface 68, the controller 68 may generate and output on the display 69 first and second indicia 104*a*, 104*b* associated with low air loss therapy and turn assist therapy. In the second configuration of the user interface 68, the controller 68 may generate and output on the display 69 only the first indicia 104*a* (compare FIGS. 19 and 20). The controller 66 may also be in communication with various light sources (e.g., LEDs) arranged on the user interface 68 to selectively activate and/or deactivate the light sources to selectively illuminate various user-selectable buttons 106 or other user input devices on the user interface 68. In the first configuration a first set of the user-selectable buttons 106 may be illuminated to indicate to the user that certain functions may be selected by the user, while in the second configuration, a smaller subset of user-selectable buttons 106 may be illuminated to indicate to the user that less functions may be selected by the user (compare FIGS. 19 and 20). Other configurations of therapy devices and therapies are also possible.

Referring back to FIG. 3, one or more sensors S, such as pressure sensors, are coupled to the controller 66. The controller 66 is configured to detect which of the connectors 76, 78 is operatively coupled to the supply connector 72 based on one or more signals from the sensors S. As shown in FIG. 3, a first sensor S is associated with the supply port 74*a*, a second sensor S is associated with the supply port 74*b*, and a third sensor S is associated with the supply port 74*c*. The first sensor S is arranged to measure fluid pressure in a first fluid line L coupled to the supply port 74*a*, the second sensor S is arranged to measure fluid pressure in a second fluid line L coupled to the supply port 74*b*, and a third sensor S is arranged to measure fluid pressure in a third fluid line L coupled to the supply port 74*c*. The controller 66 receives input signals from the sensors S to determine whether the supply connector 72 is coupled to the connector 76 or the connector 78 based on a difference in pressure sensed by the first sensor S when the supply connector 72 is coupled to the connector 76 as compared to when the supply connector 72 is coupled to the connector 78.

The sensors S are placed in fluid communication with either the ports 80*a*-80*c* or the ports 82*a*-82*c* once the fluid source 60 is connected to one of the patient supports 32*a* or 32*b* via the fluid supply line 84. Once connected, and upon start-up, the controller 66 is configured to activate the fluid supply device 64 to supply fluid to the ports 80*a*-80*c* or 82*a*-82*c*, such as through a valve manifold with solenoid valves V (e.g., two-way or three-way valves) configured to selectively route fluid to the ports 80*a*-80*c* or 82*a*-82*c* or to atmosphere A. If any of the sensors S detect a pressure signature consistent with a blockage (e.g., a quick rise in pressure), then the controller 66 is able to identify which of the ports is blocked and which are open and available for fluid communication. The controller 66 is then able to determine which patient support 32*a* or 32*b* is connected, i.e., one with both low air loss and turn assist systems or one with only a turn assist system (of course, other configurations are possible). This information may be stored in a look-up table in memory of the controller 66 that associates patient supports 32*a*, 32*b* with the feedback from the sensors S (e.g., the pressure signatures) and the determination of open/blocked ports.

The controller 66 can access the look-up table to determine which patient support 32*a*, 32*b* is being used by comparing the pressure measurements to the look-up table. For example, when the patient support 32*a* is connected, the ports 80*a*, 80*b*, 80*c* are all open to receive fluid, so the pressure rise should be gradual, e.g. below a predetermined pressure threshold over a predetermined period of time, since the low air loss system operates under low pressure and the turn assist system has relatively large air bladders to be filled with fluid. Conversely, when the patient support 32*b* is connected, only the port 82*c* is open to fluid communication for the low air loss system, while the ports 82*a*, 82*b* are blocked. Accordingly, the pressure rise for the third sensor S, which measures pressure in the fluid line L attached to port 82*c*, should be gradual, but the pressure rise for the first and second sensors S, which measure pressure in the fluid lines L attached to ports 82*a*, 82*b*, which are blocked should be significant, e.g., above the predetermined pressure threshold over the predetermined period of time. The pressure threshold and the period of time for measuring the pressure may be stored in the memory for access by the controller 66 to execute this algorithm of sensing the pressures, comparing the pressures to the threshold pressure over the predetermined period of time, and identifying the patient support 32*a* or 32*b* based on the results of this comparison (e.g., are measured pressures below or above the threshold).

Once the controller 66 identifies the connected patient support 32*a* or 32*b*, the controller 66 can then modify the user interface 68 accordingly, by loading different software based on the different configurations of the patient support 32*a*, 32*b*. As noted above, if only the low air loss system is employed, input and display features associated with turn assist would not be shown and vice versa. Similarly, if both low air loss and turn assist systems are employed and in use, the user interface 68 may have user inputs associated with both (e.g., to turn each on/off, set fluid flow rates for each, set durations of use for each, etc.) and may have different output displayed based on configuration as well.

Figure 3A:
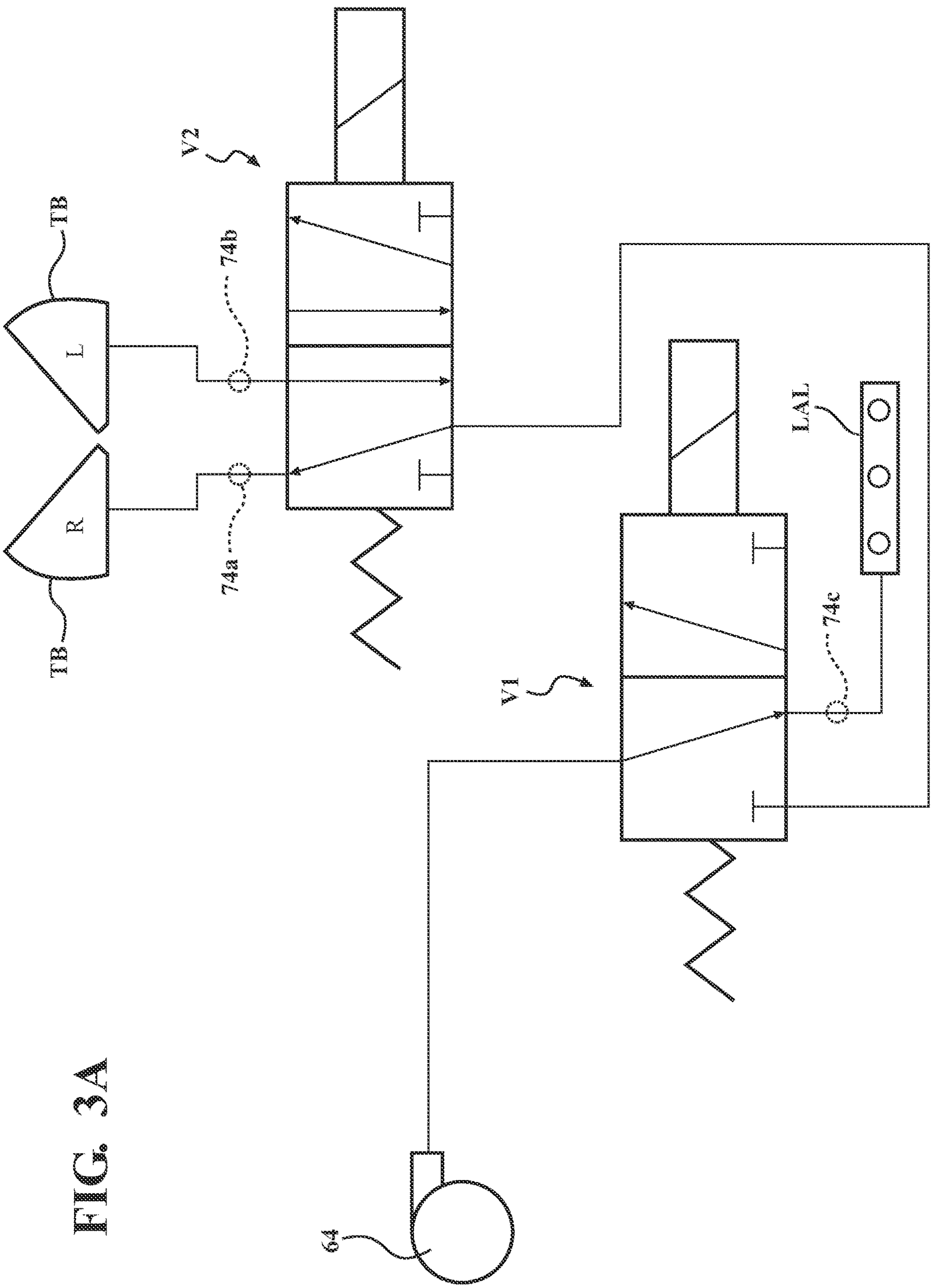
FIG. 3A is a schematic view of one embodiment of a solenoid valve arrangement to control the flow of fluid from a fluid supply device to a low air loss system and right and left turn bladders of a turn assist system.

It should be appreciated that fluid paths are illustrated by broken lines in FIG. 3 to show fluid connections to the sensors S and to show one suitable valve arrangement. However, other arrangements of the fluid supply device 64, valves V, sensors S, and fluid lines L are possible. For example, one specific valve arrangement is shown in FIG. 3A in which the fluid source 60 is connected to the patient support 32*a* having both the low air loss system and the turn assist system. In this embodiment, the fluid supply device 64 is shown as a pump that supplies fluid (e.g., air) to a first valve V1 (e.g., illustrated as a two-position, three-port solenoid valve). In the current position, the first valve V1 directs the fluid from the fluid supply device 64 to the low air loss system (e.g., one or more tubes with apertures—identified as LAL). At the same time, fluid flow from the fluid supply device 64 is closed to the turn assist system. When the first valve V1 is actuated by the controller 66 in response to user input, or automatically, fluid flow from the fluid supply device 64 is diverted to the turn assist system (e.g., one or more turn bladders—identified as right and left turn bladders TB) and fluid flow is closed to the low air loss system. In particular, the fluid flows to a second valve V2 (e.g., illustrated as a two-position, five-port solenoid valve). In the current position, the second valve V2 directs the fluid flow from the fluid supply device 64 to the right turn bladder TB, while the left turn bladder TB is open to atmosphere to be exhausted. When the second valve V2 is actuated by the controller 66 in response to user input, or automatically, fluid flow from the fluid supply device 64 is diverted to the left turn bladder TB and the right turn bladder TB is opened to atmosphere to be exhausted.

Figure 6:
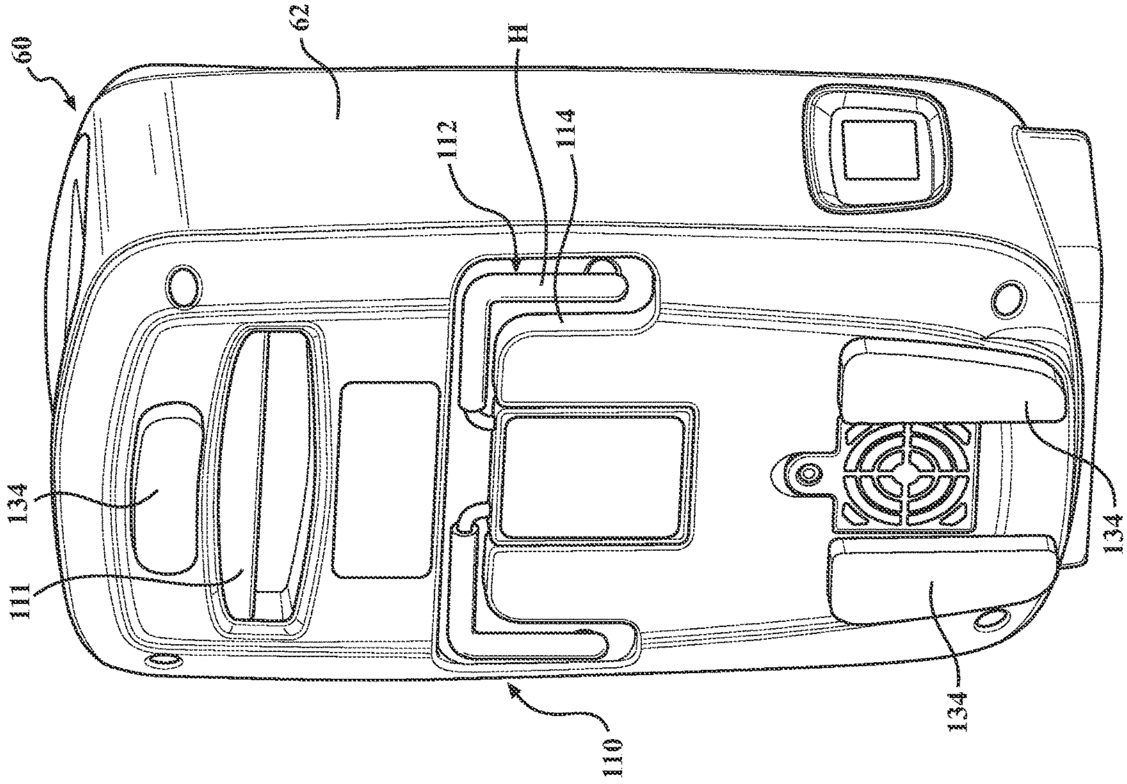
FIGS. 5 and 6 are rear perspective views of the fluid source.
Figure 5:
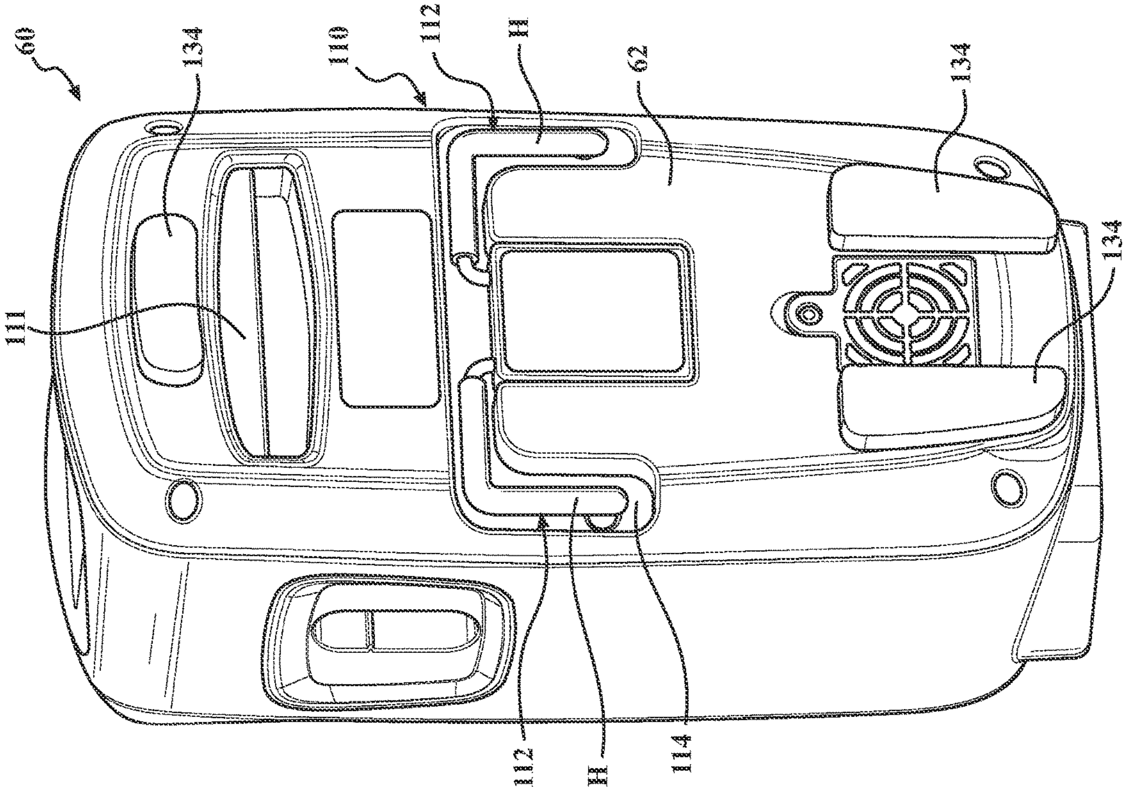

Referring to FIGS. 5 and 6, the fluid source 60 comprises a hanger assembly 110 operatively coupled to the housing 62 and a handle 111 to carry the fluid source 60. The hanger assembly 110 comprises one or more hangers 112 having hooks H or other hanging features. In the version shown, two hangers 112 are provided, but one or more hangers 112 could be employed. Each of the hangers 112 is movable from a stowed position, in which the hanger 112 is disposed adjacent to the housing 62, to a plurality of discrete extended positions, in which the hanger 112 extends away from the housing 62 at varying distances to accommodate hanging the fluid source 60 on different support structures (compare FIGS. 10A and 10B for example). In the stowed position, the hanger 112 fits within a recess 114 formed in the housing 62. In each of the discrete, extended positions, the hanger 112 moves out of the recess 114 to extend away from an outer surface of the housing 62.

The hanger assembly 110 may be located closer to a midline of the housing 62 between a top and bottom of the housing 62 rather than near the top of the housing 62 so that the fluid source 60 is positioned above a top of the footboard 130 for easier access to the user interface 68 (see, for example, FIG. 1).

Figure 9:
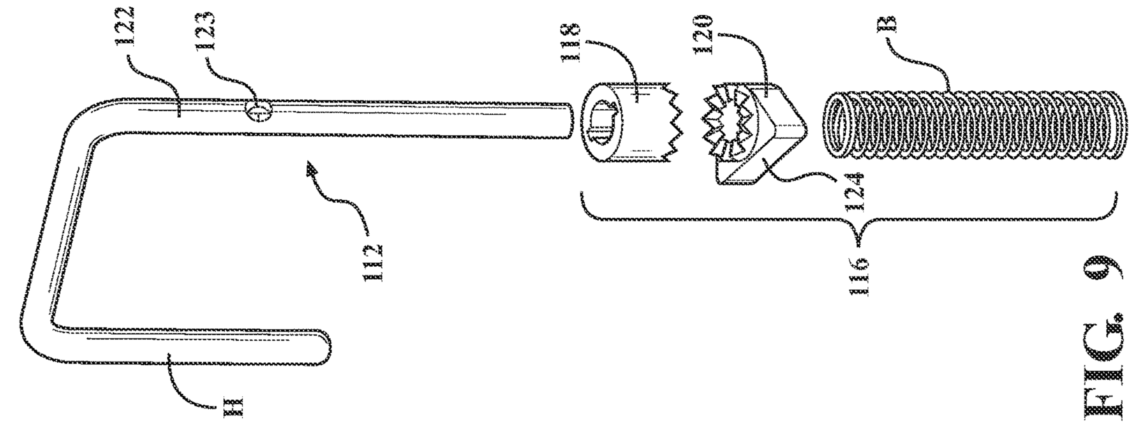
FIG. 9 is an exploded view of the hanger assembly illustrating a first hanger.
Figure 7:
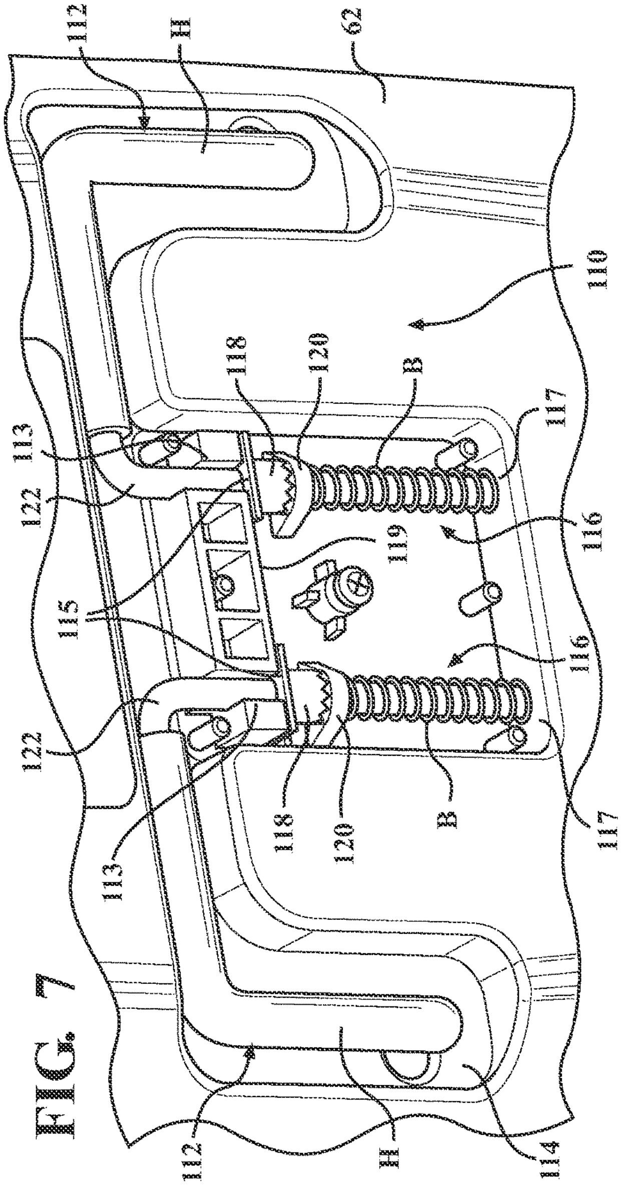
FIG. 7 is a perspective view of a hanger assembly of the fluid source.
Figure 8:
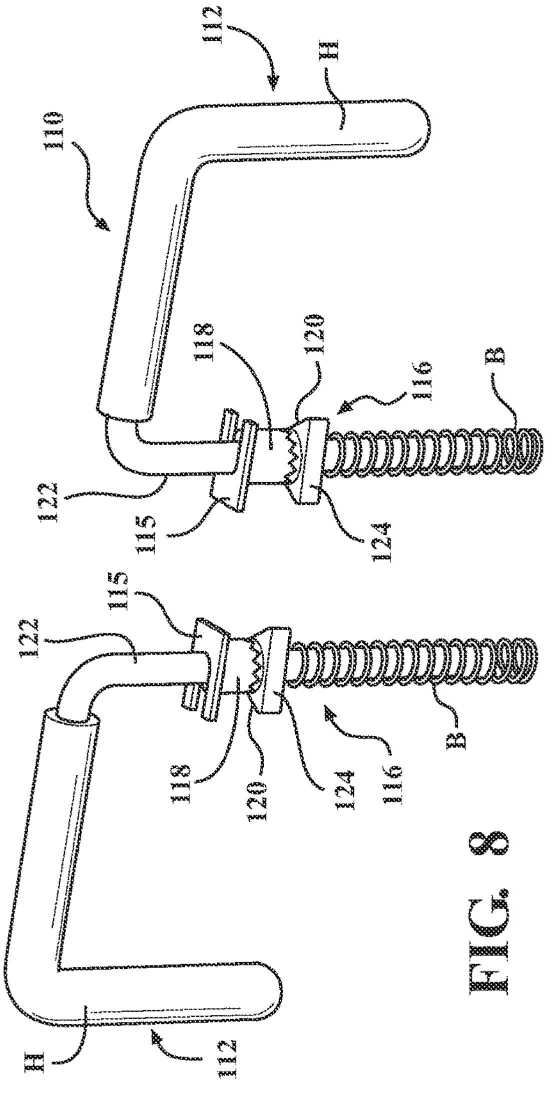
FIG. 8 is a perspective view of the hanger assembly separated from a housing of the fluid source.

In the version shown, referring to FIGS. 7-9, each of the hangers 112 comprises a rotatable shaft 122 that is rotatably secured to the housing 62 by being supported for rotation in a slot 113 of the housing 62 via a retainer plate 115. The retainer plate 115 has a second slot arranged cross-wise to the slot 113 to secure the rotatable shaft 122 along a rotational axis. The rotatable shaft 122 extends to a base end that is supported in pockets 117 in the housing 62 to further secure the rotatable shaft 122 along the rotational axis so that the rotatable shaft 122 rotates about the rotational axis. The retainer plates 115, which are captured beneath a portion 119 of the housing 62, further act to prevent the rotatable shaft 122 from lifting out of the pockets 117. The retainer plates 115 may be fixed to the housing 62 by fasteners, adhesive, welding, or the like. The rotatable shafts have projections 123 (one shown in FIG. 9, but a diametrically opposed projection 123 is also present) that extend outwardly from an outer surface of the rotatable shaft 122. These projections 123 are sized so that the projections 123 are unable to pass through the retainer plate 115.

As best shown in FIGS. 8 and 9, the hanger assembly 110 comprises a detent mechanism 116 coupled to each of the hangers 112. Each detent mechanism 116 comprises a first detent element 118 with a first plurality of teeth and a second detent element 120 with a second plurality of teeth shaped to mate with and engage the first plurality of teeth in the stowed position and each of the plurality of discrete, extended positions. The first detent element 118 is arranged to rotate relative to the second detent element 120 as described below to enable movement of the hanger 112 from the stowed position to each of the plurality of discrete, extended positions. The detent mechanism 116 comprises a biasing device B operatively engaging the second detent element 120 to bias the second plurality of teeth into mating engagement with the first plurality of teeth at each of the plurality of discrete extended positions.

The first detent element 118 is coupled to the hanger 112 to rotate with the hanger 112 relative to the second detent element 120 from the stowed position to each of the plurality of discrete extended positions. As shown in FIG. 9, the first detent element 118 defines an opening to receive the rotatable shaft 122 and a pair of diametrically opposed grooves shaped to receive the projections 123 such that the projections and grooves mate to lock rotation of the rotatable shaft 122 to the first detent element 118, i.e., so that when the user rotates the hanger 112 into a desired position, the first detent element 118 rotates with the hanger 112 about the rotational axis.

The second detent element 120 is slidably coupled to the hanger 112 to slide along the rotatable shaft 122 as the rotatable shaft 122 and the first detent element 118 rotate together relative to the second detent element 120. The second detent element 120 comprises an abutment 124 shaped to abut the housing 62 to prevent rotation of the second detent element 120 relative to housing 62. The biasing device B acts between the housing 62 and the second detent element 120 to bias the second detent element 120 into engagement with the first detent element 118. The biasing device B may comprise a compression spring, elastic member, other resilient member, or the like.

Prior to operation, i.e., prior to the hanger 112 being moved by the user, the second plurality of teeth of the second detent element 120 mate with the first plurality of teeth of the first detent element 118. As the user grasps the hanger 112 and begins to rotate the hanger 112 about the rotational axis, the first detent element 118 also begins to rotate owing to its connection to the rotatable shaft 122 via the projections 123. At the same time, the first plurality of teeth of the first detent element 118 bear against the second plurality of teeth of the second detent element 120, which, owing to the shape of the teeth and the second detent element 120 being prevented from rotation by the abutment 124, pushes the second detent element 120 downwardly along the rotatable shaft 122 and against the bias of the biasing device B. This allows the first plurality of teeth to adjust to a different orientation relative to the second plurality of teeth. Once the user is satisfied with the new position, the user releases the hanger 112. Owing to the biasing force from the biasing device B, the first plurality of teeth reengage the second plurality of teeth in mating engagement at a new, discrete, position. The number of discrete positions of the detent mechanism 110 may comprise three or more discrete positions, e.g., the stowed position and two or more extended positions. In the embodiment shown, the number of discrete positions is a function of the number of teeth provided, which may be three or more teeth to provide three or more discrete positions, five or more teeth to provide five or more discrete positions, ten or more teeth to provide ten or more discrete positions, or the like.

Figure 10A:
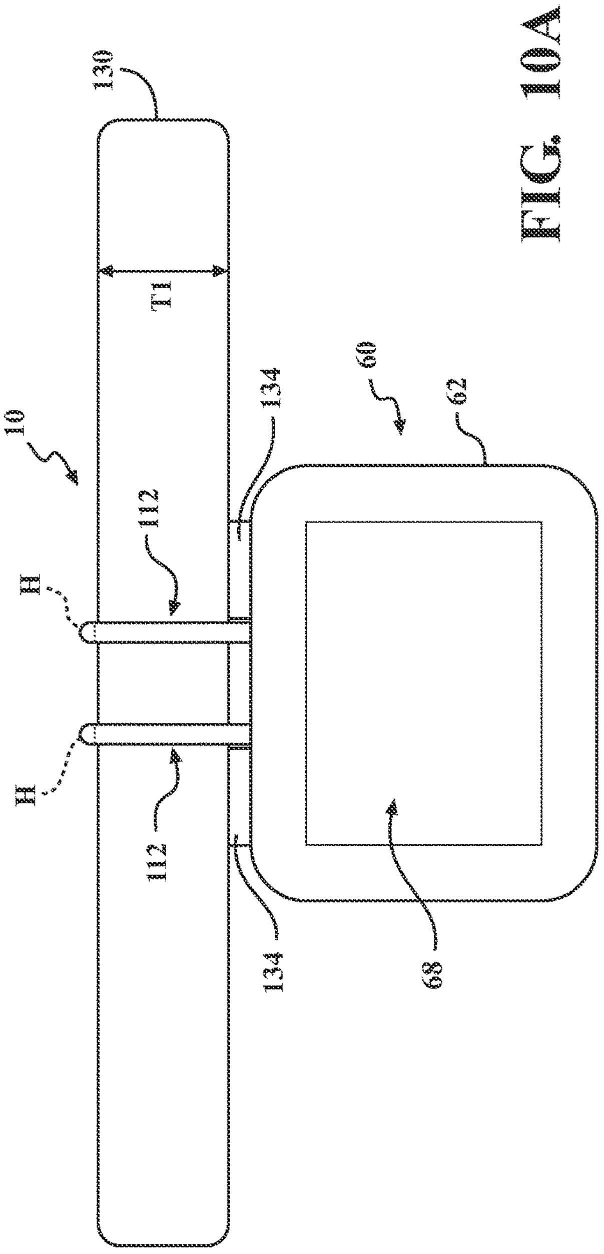
FIGS. 10A and 10B are illustrations of attaching the fluid source to support structures of different thicknesses using the hanger assembly.
Figure 10B:
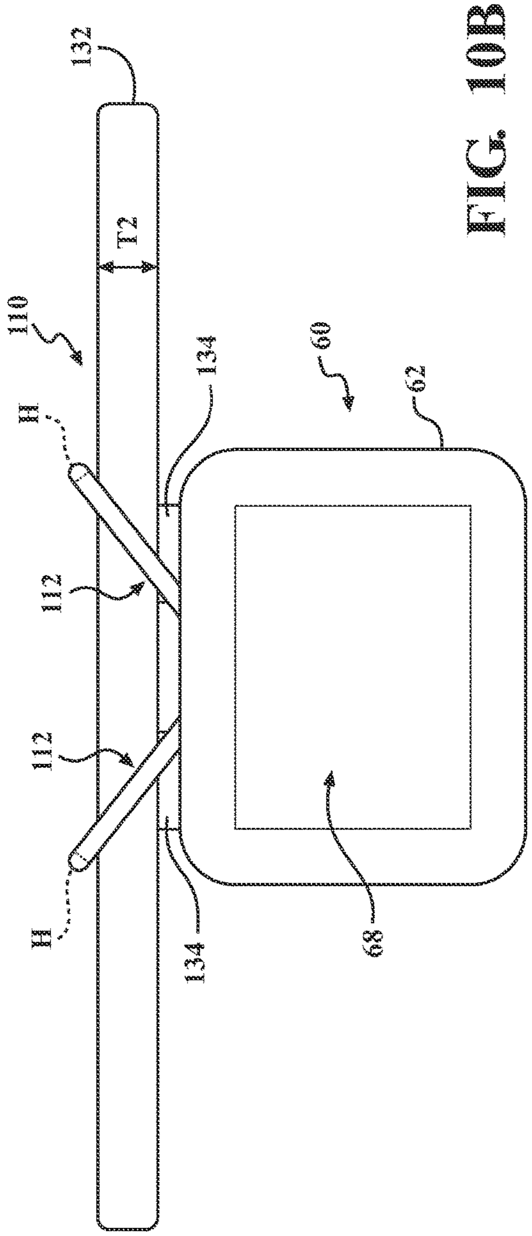

Referring to FIGS. 10A and 10B, the hanger assembly 110 may be deployed at varying distances away from the housing 62 to hang the fluid source 60 on different support structures. For example, the hangers 112 may be utilized to hang the fluid source 60 on a footboard 130 having a first thickness T1 (FIG. 10A) or may be utilized to hang the fluid source 60 on a different footboard 132 having a second thickness T2, smaller than the first thickness (FIG. 10B). Owing to the detent mechanism 116 provided for each of the hangers 112, the hangers 112 can be deployed to discrete, extended positions sized so that the fluid source 60 fits neatly to either of the footboards 130, 132. More specifically the hangers 112 can be moved to varying positions to vary spacing between the hooks and bumpers 134 on a back surface of the fluid source 60 to match the thickness T1, T2 (compare FIGS. 10A and 10B). Additionally, the biasing devices B and tooth configurations of the detent elements 118, 120 may be configured to provide a suitable resistance to the hangers 112 being inadvertently extended further out while hanging on the footboard 132.

Figure 12:
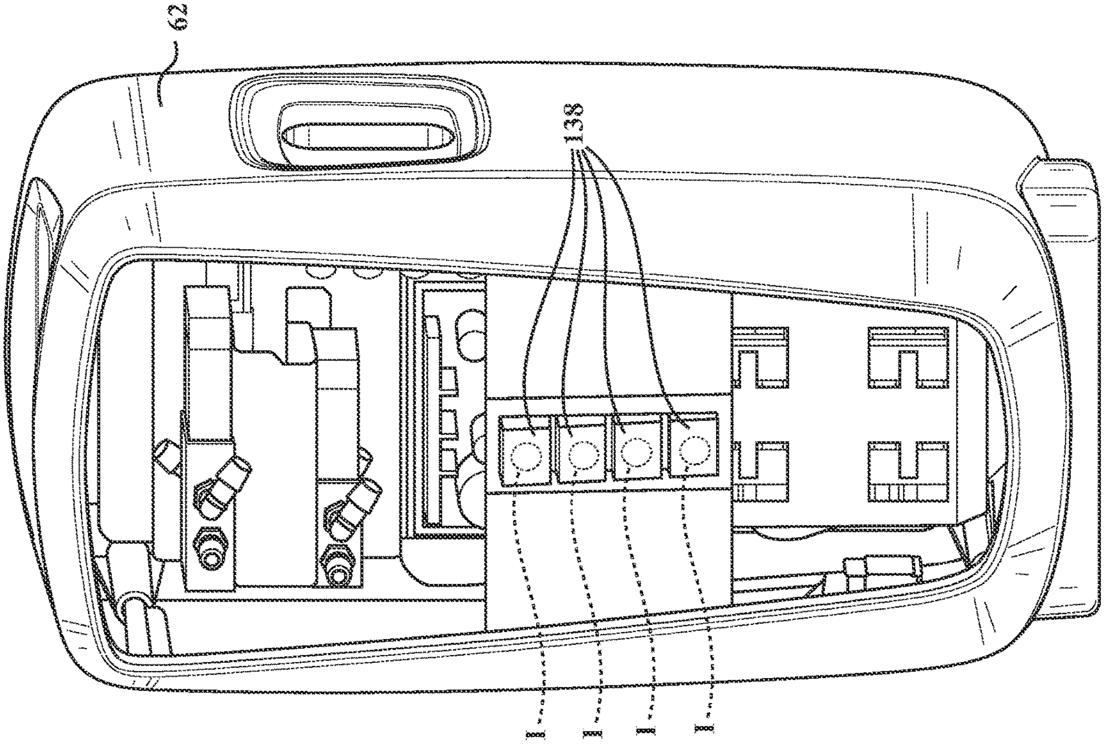
FIG. 12 is a front perspective view of the fluid source with a front panel removed.
Figure 11:
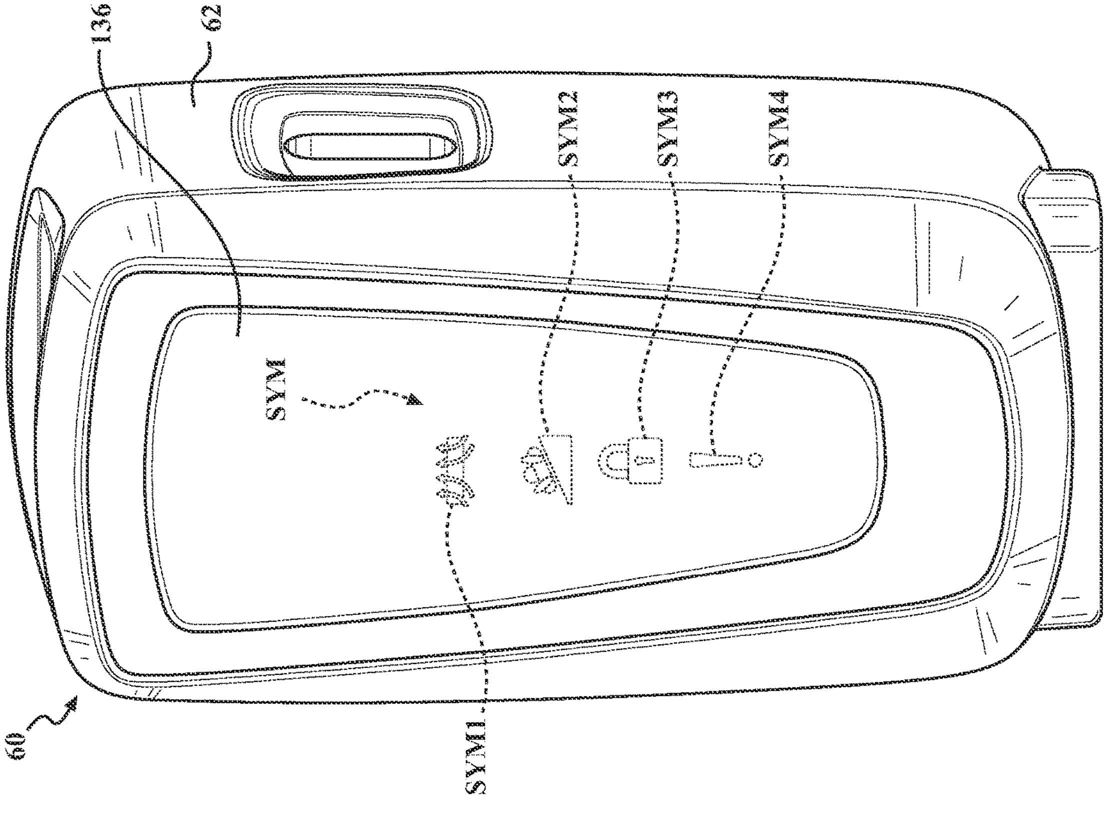
FIG. 11 is a front perspective view of the fluid source.
Figure 13:
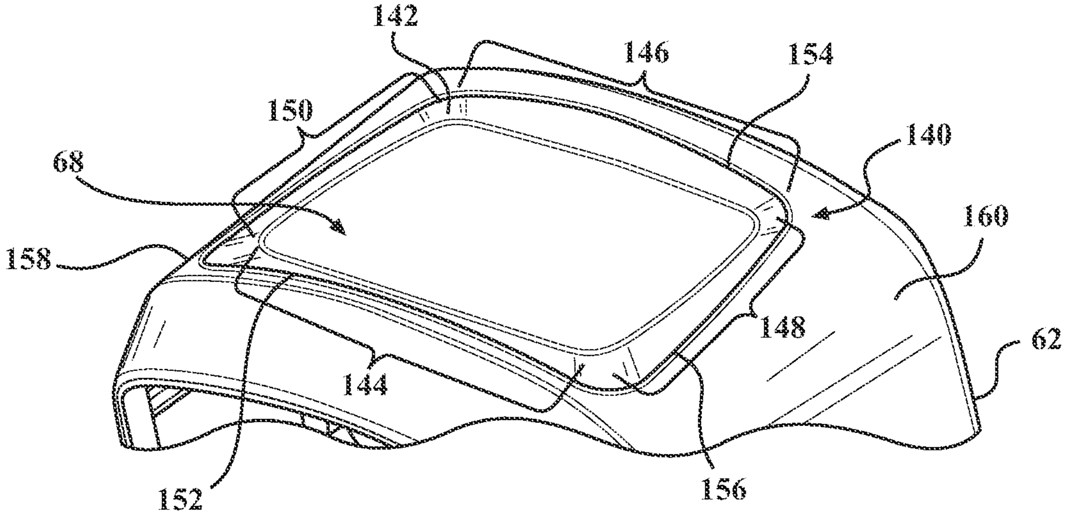
FIG. 13 is a top perspective view of a user interface of the fluid source.
Figure 14:
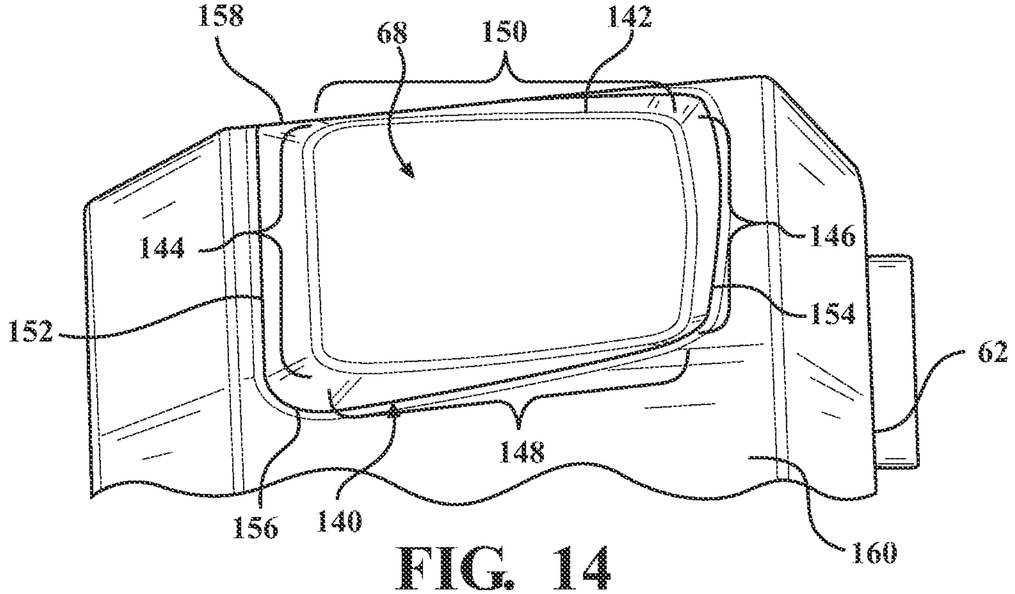
FIG. 14 is a top/side perspective view of the user interface.
Figure 15:
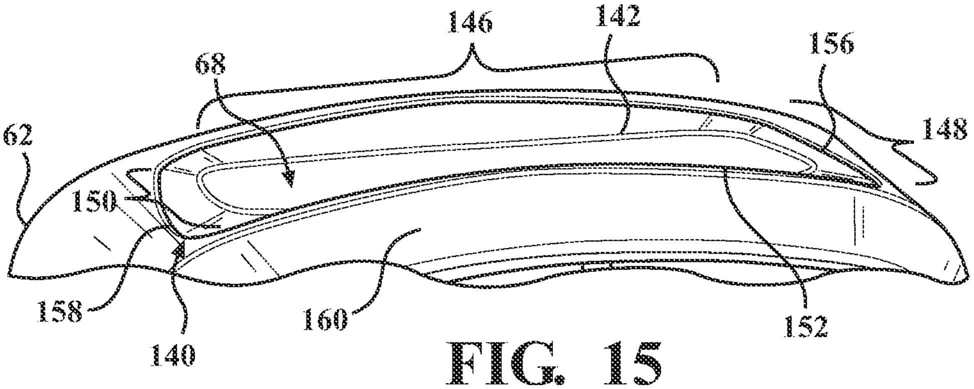
FIG. 15 is top/front perspective view of the user interface.
Figure 16:
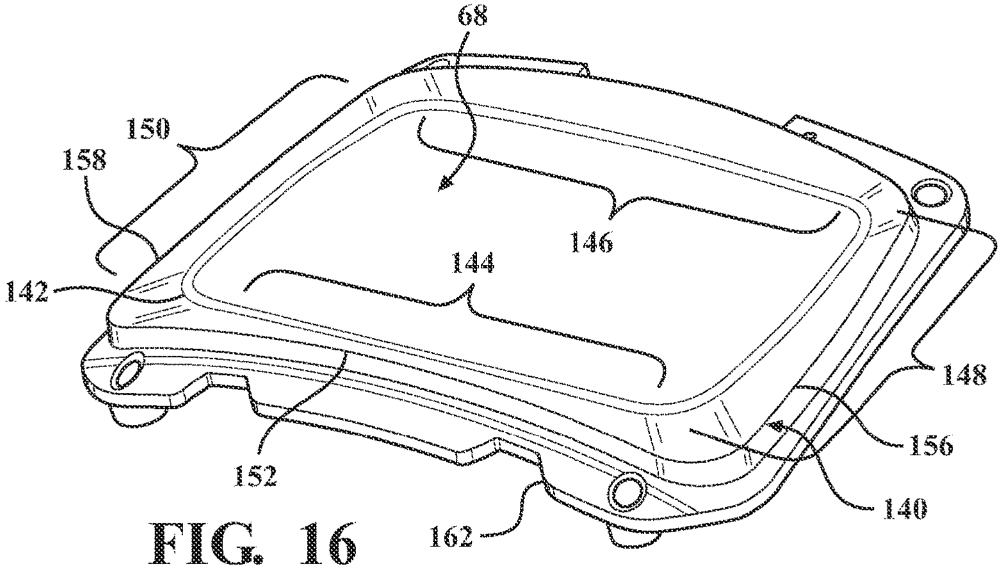
FIG. 16 is a top perspective view of a watershed panel of the housing.
Figure 17:
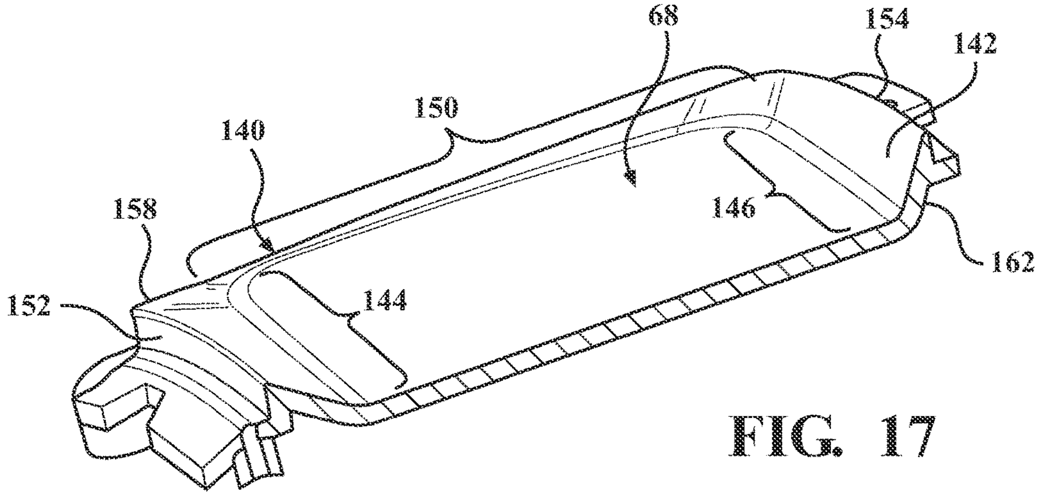
FIGS. 17 and 18 are cross-sectional views of the watershed panel.
Figure 18:
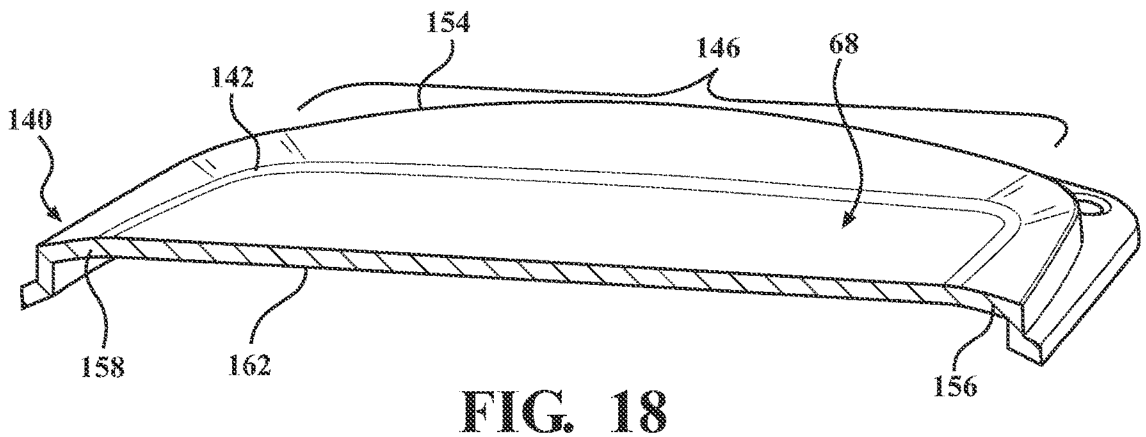

Referring to FIGS. 11 and 12, one or more indicator lights I are operatively coupled to the controller 66 and disposed beneath an indicator panel 136 (indicator panel 136 removed in FIG. 12). The indicator lights I may comprise any suitable light source, such as one or more light-emitted diodes (LEDs), or the like. The indicator lights I may illuminate in different colors, the same color, or may be controllable by the controller 66 to illuminate in different colors. Lenses 138 may be positioned over the indicator lights I to focus light from the indicator lights, or the like. In the embodiment shown, the indicator panel 136 is a front panel of the housing 62, but could be any panel of the housing 62 or other component of the fluid source 60. As shown in FIG. 11, the indicator panel may be formed of any suitable material that is generally translucent or may be opaque to light.

The indicator lights I are configured to illuminate one or more symbols SYM associated with the various therapies capable of being provided by the therapy devices, e.g., the patient supports 32*a*, 32*b*. The number, type, and arrangement of the symbols SYM shown in FIG. 11 is merely exemplary, and other numbers, types, and/or arrangements of symbols are possible.

In the version shown, a first symbol SYM1 may be associated with low air loss therapy and a second symbol SYM2 may be associated with turn assist therapy. One of the indicator lights I may be coupled to the controller 66 and controlled by the controller 66 to illuminate the first symbol SYM1 in response to the user providing input via the user interface 68 to operate the fluid supply device 64 to provide the low air loss therapy to the patient. Another indicator light I may be coupled to the controller 66 and controlled by the controller 66 to illuminate the second symbol SYM2 in response to the user providing input via the user interface 68 to operate the fluid supply device 84 to provide the turn assist therapy to the patient.

Another indicator light I may be coupled to the controller 66 and controlled by the controller 66 to illuminate a third symbol SYM3 associated with a locking function in response to the user providing input via the user interface 68 to lock operation of the fluid supply device 64. In this case, the user input is received by the controller 66 and the controller 66 disables operation of the fluid supply device 64 until the user later unlocks operation, for instance, by toggling a user input device associated with the locking function to an unlocked configuration.

Another indicator light I may be coupled to the controller 66 and controlled by the controller 66 to illuminate a fourth symbol SYM4 associated with a warning in response to a malfunction or error in operation of the fluid source 60. In this case, the controller 66 identifies the malfunction or error and disables operation of the fluid supply device 64 until the malfunction or error is fixed.

The indicator lights I associated with these symbols SYM may be, for example, configured to emit green light (e.g., for SYM1, SYM2, and/or SYM3), yellow light (e.g., for SYM3 and/or SYM4), amber light (e.g., for SYM3 and/or SYM4), red light (e.g., for SYM3 and/or SYM4), combinations thereof, or the like.

The symbols SYM may be etched into the indicator panel 136 to be illuminated by the indicator lights I or the symbols may be cut out of the indicator panel 136 to allow light to illuminate the symbols. Other configurations are possible to illuminate the symbols SYM. In the version shown, the indicator panel 136 is formed of a generally translucent plastic material. The symbols SYM are etched or otherwise formed in the translucent plastic material such that a thin layer of the material is present between the indicator lights I and the exterior of the indicator panel 136. As a result, more light is able to penetrate through the thin layer than is able to penetrate the portion of the indicator panel 136 surrounding the thin layer. Thus, the indicator panel 136 continues to provide an unbroken barrier to contaminants by being continuous across its outer surface, yet the symbols SYM are able to be differentiated and distinguished when illuminated.

The indicator panel 136 defines a front surface of the housing 62 opposite the hanger assembly 110 so that the user is able to remotely view the fluid source 60 to determine which, and if any, of the symbols SYM are being illuminated through the front surface when the fluid source 60 is hanging on a support structure, such as the footboards 130, 132. At the same time, the controller 66 may output signals to the display 69 to display one or more of the symbols SYM at the same time that the symbols SYM are illuminated through the housing 62.

The user interface 68 may also be configured to visually provide information to a medical provider concerning whether or not a certain therapy is active or inactive. In particular, the user interface 68 may be configured to display inactive functionality (i.e., therapy) of the fluid source 60 as an outlined image and active functionality as a filled, solid colored image. For example, when user interface 68 displays low air loss symbol SYM1 as an outline and not a filled, solid color (FIG. 20), this appearance informs the medical provider that the fluid source 60 is not providing low air loss therapy. In contrast, when low air loss symbol SYM1 is displayed as a filled, solid colored image (FIG. 19), this appearance informs the medical provider that the fluid source 60 is currently providing low air loss therapy. In one embodiment, the user interface 68 displays inactive functionality in a white outline of a particular symbol, and active functionality as a filled, solid green symbol of the particular symbol. This systemic color scheme is advantageous because the medical provider is quickly able to ascertain whether the correct therapy is engaged, even when the medical environment is noisy.

Referring to FIGS. 13-18, the housing 62 comprises a watershed region 140 peripherally surrounding the user interface 68. The watershed region 140 is provided to facilitate the runoff of any liquid that may spill onto the user interface 68 within a periphery 142 of the user interface 68.

The periphery 142 has front and rear peripheral portions 144, 146 and side peripheral portions 148, 150. The watershed region 140 comprises a front raised portion 152 being raised relative to the front peripheral portion 144, a rear raised portion 154 being raised relative to the rear peripheral portion 146, and side runoff portions 156, 158 adjacent the side peripheral portions 148, 150.

The side runoff portions 156, 158 are shaped to allow any liquid that reaches the user interface 68 between the raised portions 152, 154 to fall by gravity off the user interface 68 and past the watershed region 140. The side runoff portions 156, 158 slope downwardly away from a top surface of the user interface 68 to facilitate the runoff of liquid that may contact the top surface (see FIG. 18). In some cases, the side runoff portions 156, 158 slope to different degrees from the top surface of the user interface 68 with maximum downward slope near the front peripheral portion 144 (see slope of side runoff portion 158 in FIGS. 15 and 17). Further, in some instances, sections of the side runoff portions 156, 158 near the rear peripheral portion 146 may slope upwardly from the top surface of the user interface 68 to further route the liquid to sections of the side runoff portions 156, 158 near the front peripheral portion 144 with maximum downward slope. Additionally, the top surface of the user interface 68 may also slope downwardly from the rear peripheral portion 146 to the front peripheral portion 144 to further facilitate the runoff effect and/or the top surface of the user interface 68 may be convex to further facilitate the runoff effect.

In the version shown, the housing 62 comprises a casing 160 and a watershed panel 162 is mounted to the casing 160 to define the watershed region 140.

Figure 19:
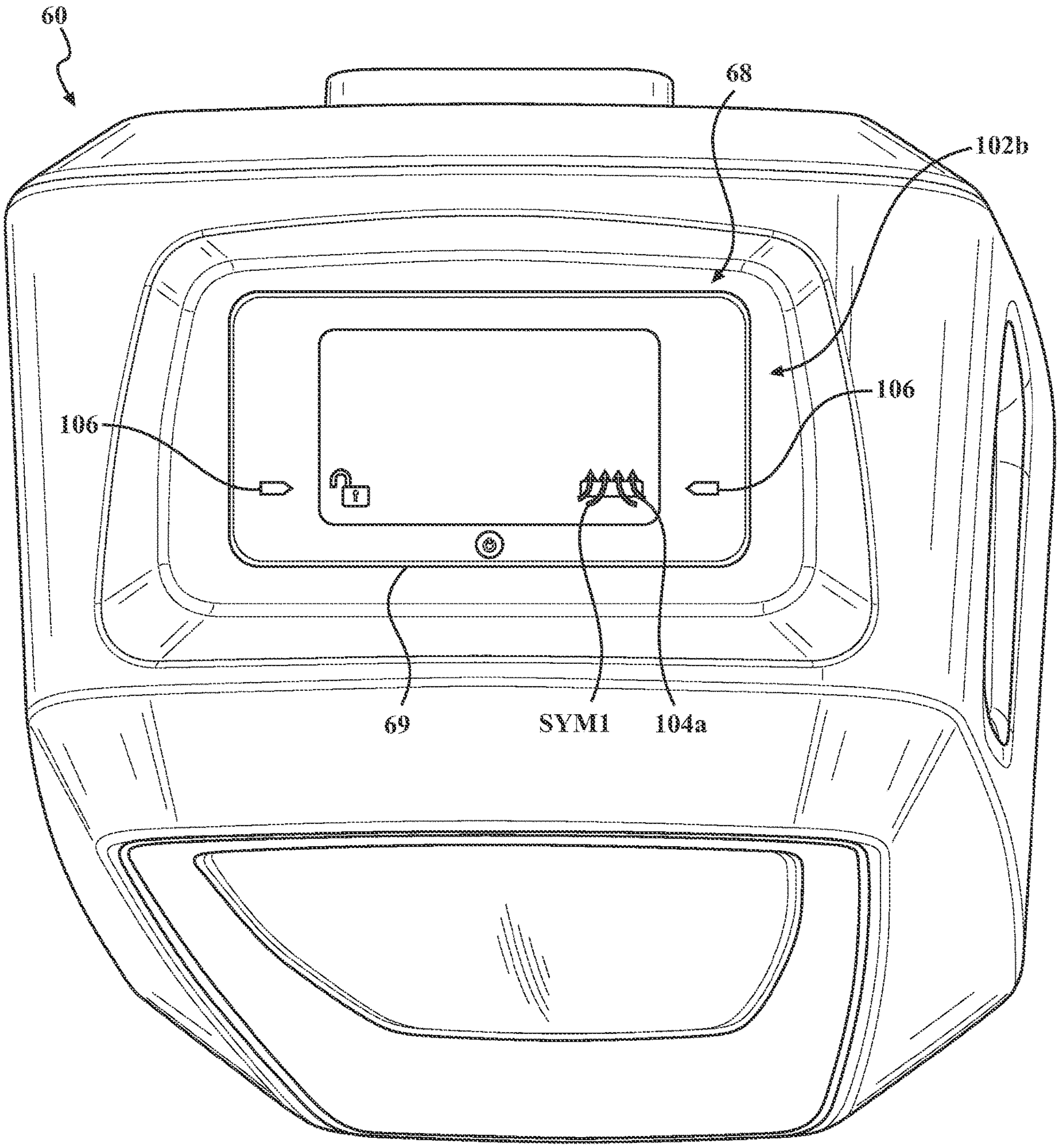
FIGS. 19-28 are various views of the user interface.
Figure 20:
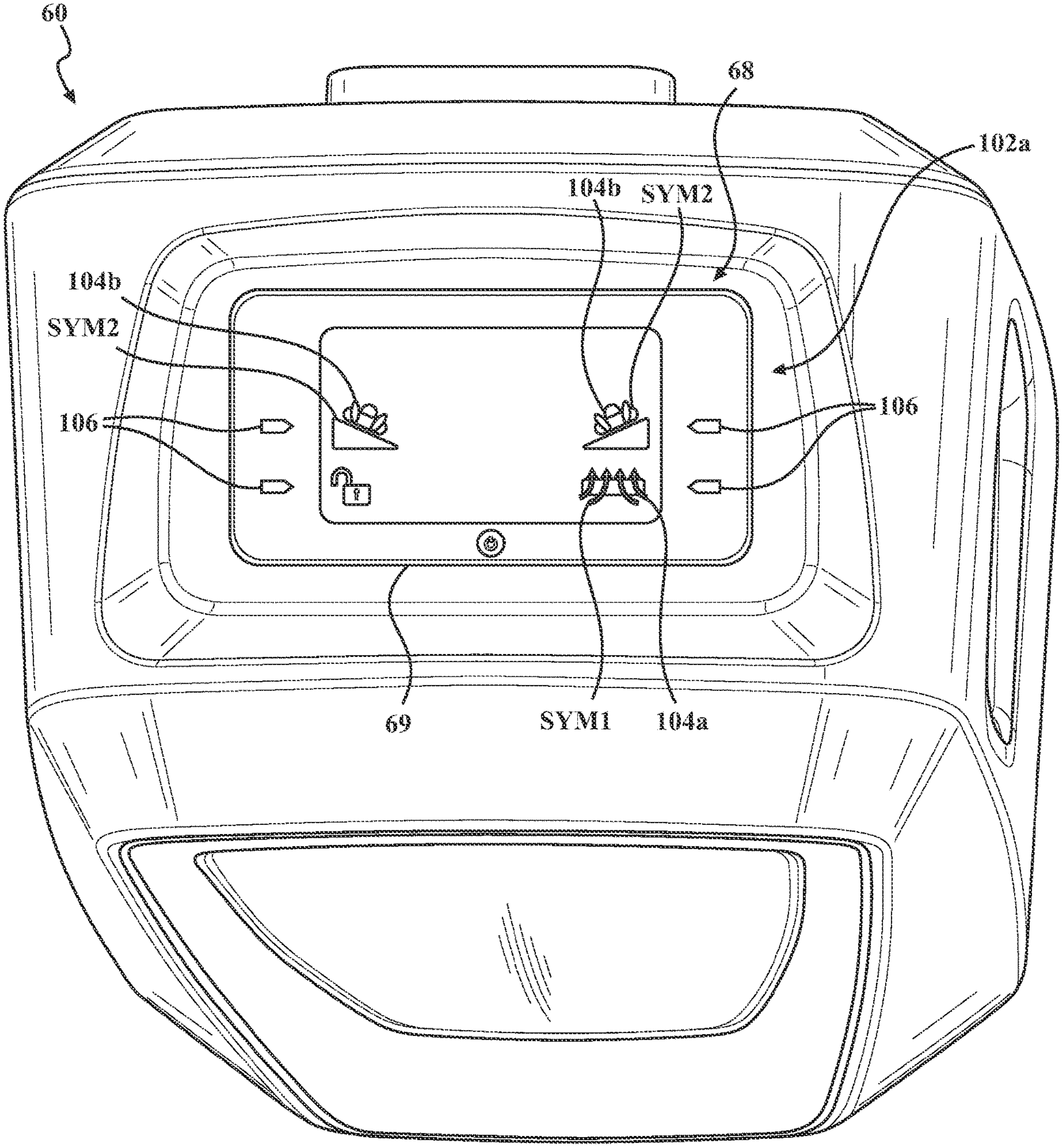

FIGS. 19 through 28 illustrate various views of the user interface 68, including the display 69. These views illustrate one example of all necessary configurations of the user interface 68, including all necessary display output, for full user operation of the fluid source 60 to provide low air loss therapy and turn assist therapy. Notably, no translatable text is present on the display 69, only symbols are used in conjunction with time parameters to communicate functions and content. As a result, the user interface 68 is configured to be universally acceptable regardless of language. For example, FIGS. 19 and 20 illustrate the low air loss symbol SYM1 (example of the indicia 104*a*) and the turn assist symbols SYM2 (example of the indicia 104*b*) previously discussed and an unlocked symbol, along with the highlighted user-selectable buttons 106 that can be toggled to turn on/off the low air loss therapy, the turn assist therapy (left or right rotation) or to lock/unlock the fluid supply device 64 from operation. The user-selectable buttons 106 may be buttons on a touchscreen, switches, piezoelectric elements, other sensors, or the like.

Figure 21:
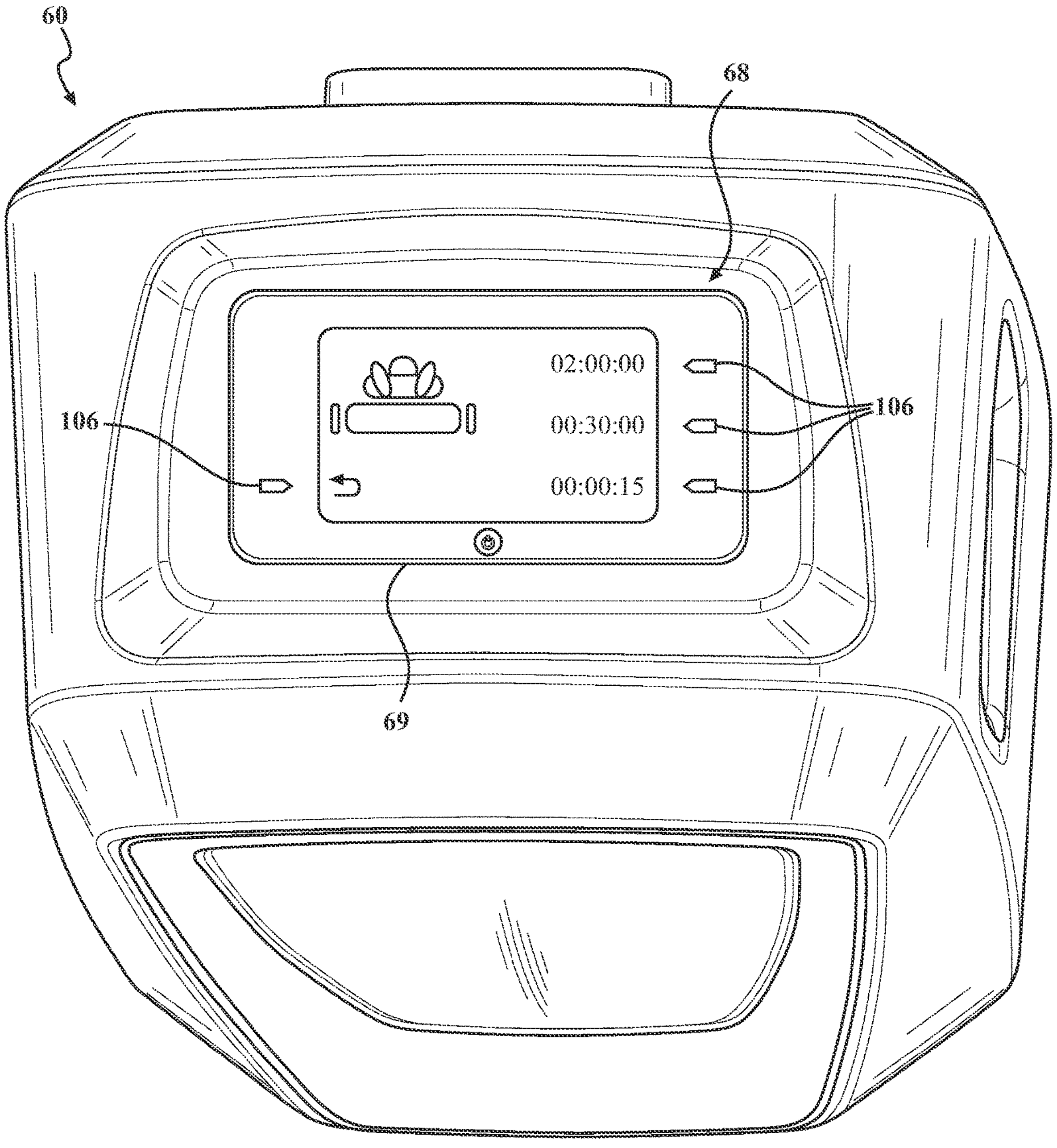

FIG. 21 illustrates the user interface 68 generated and output by the controller 66 after the turn assist function has been selected by the user. In this case, the user next needs to select, via one of the highlight user-selectable buttons 106, the duration of time for which turn assist therapy is desired, or the user can return to the previous screen.

Figure 22:
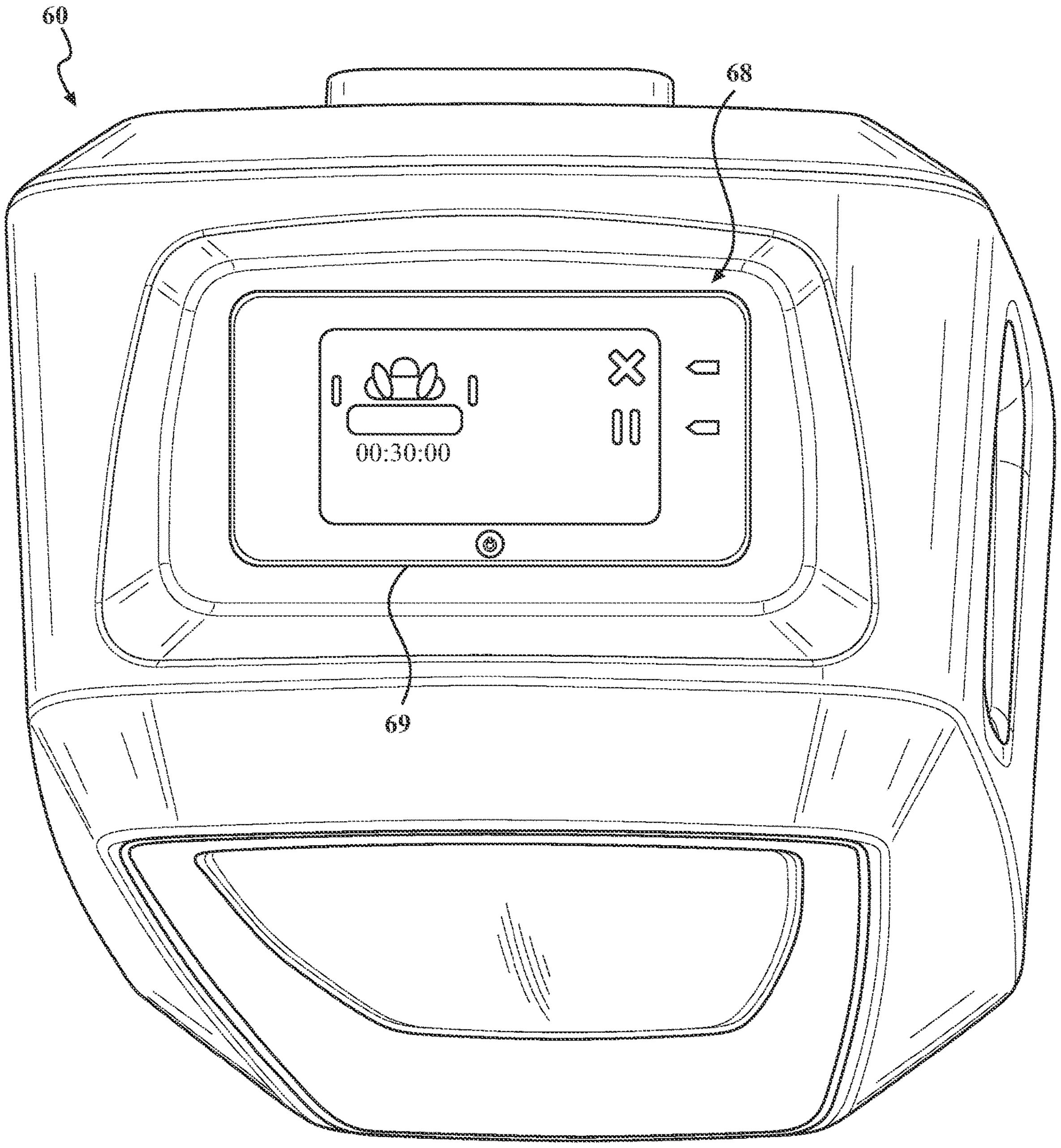
Figure 23:
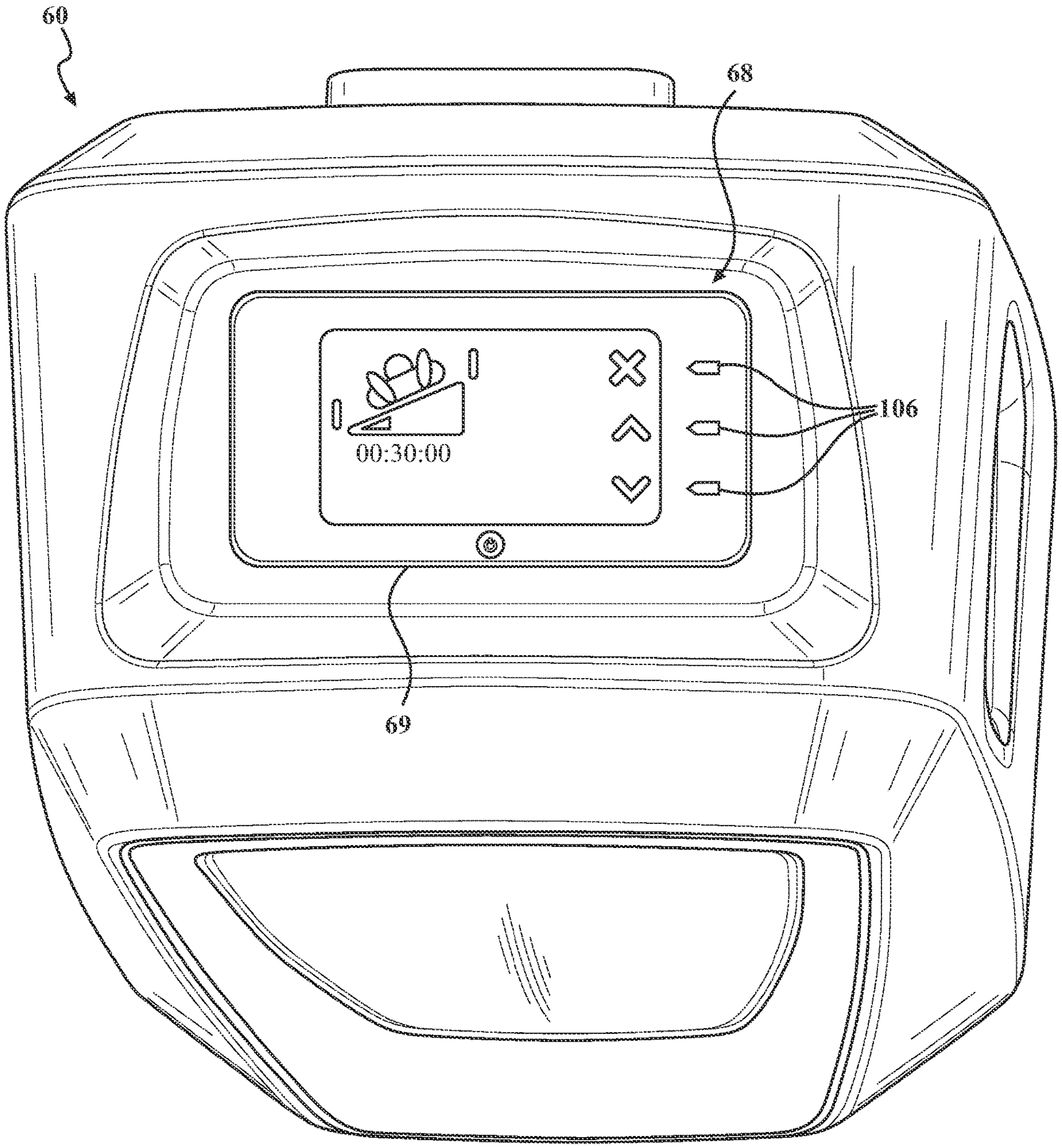
Figure 24:
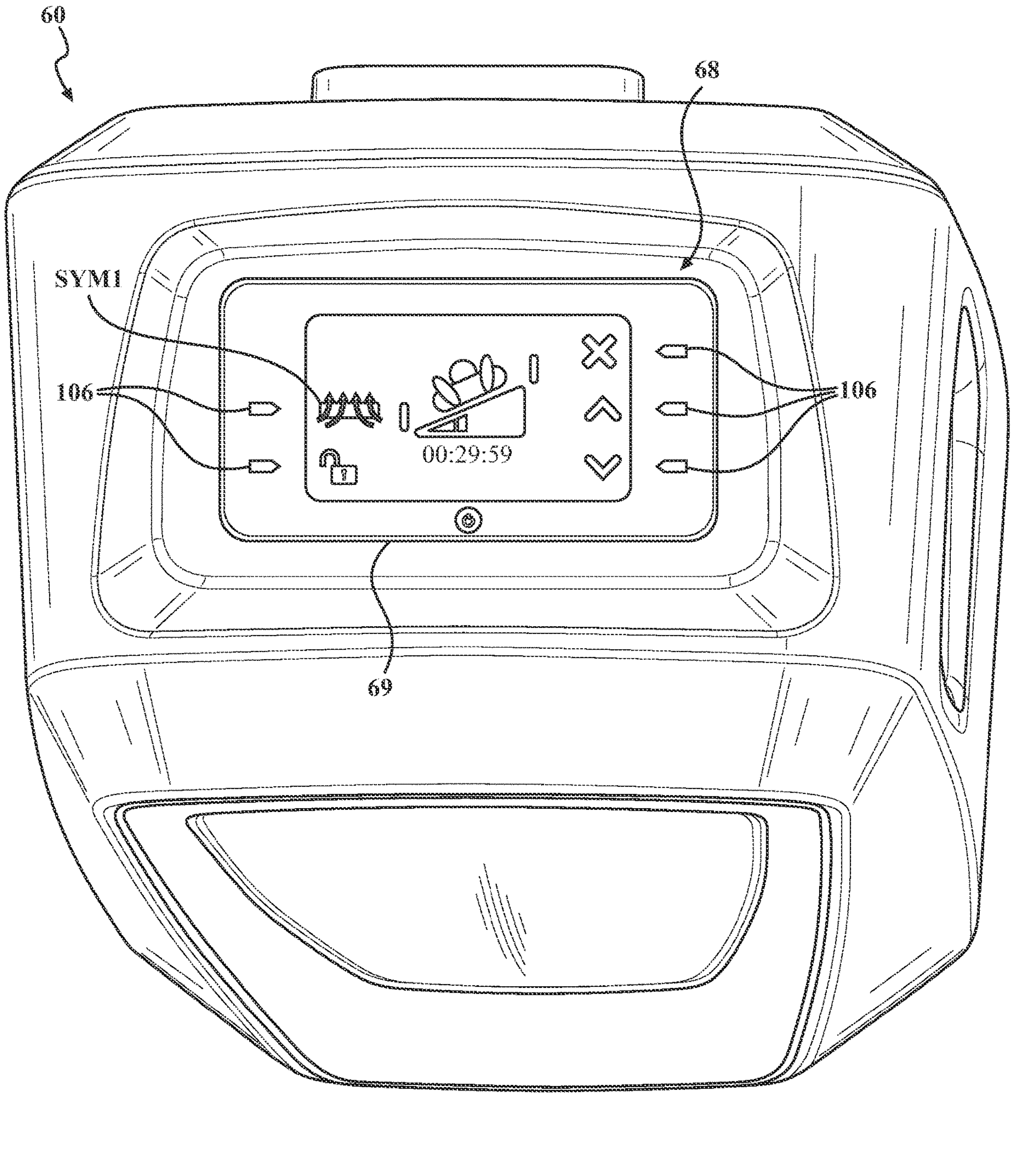
Figure 25:
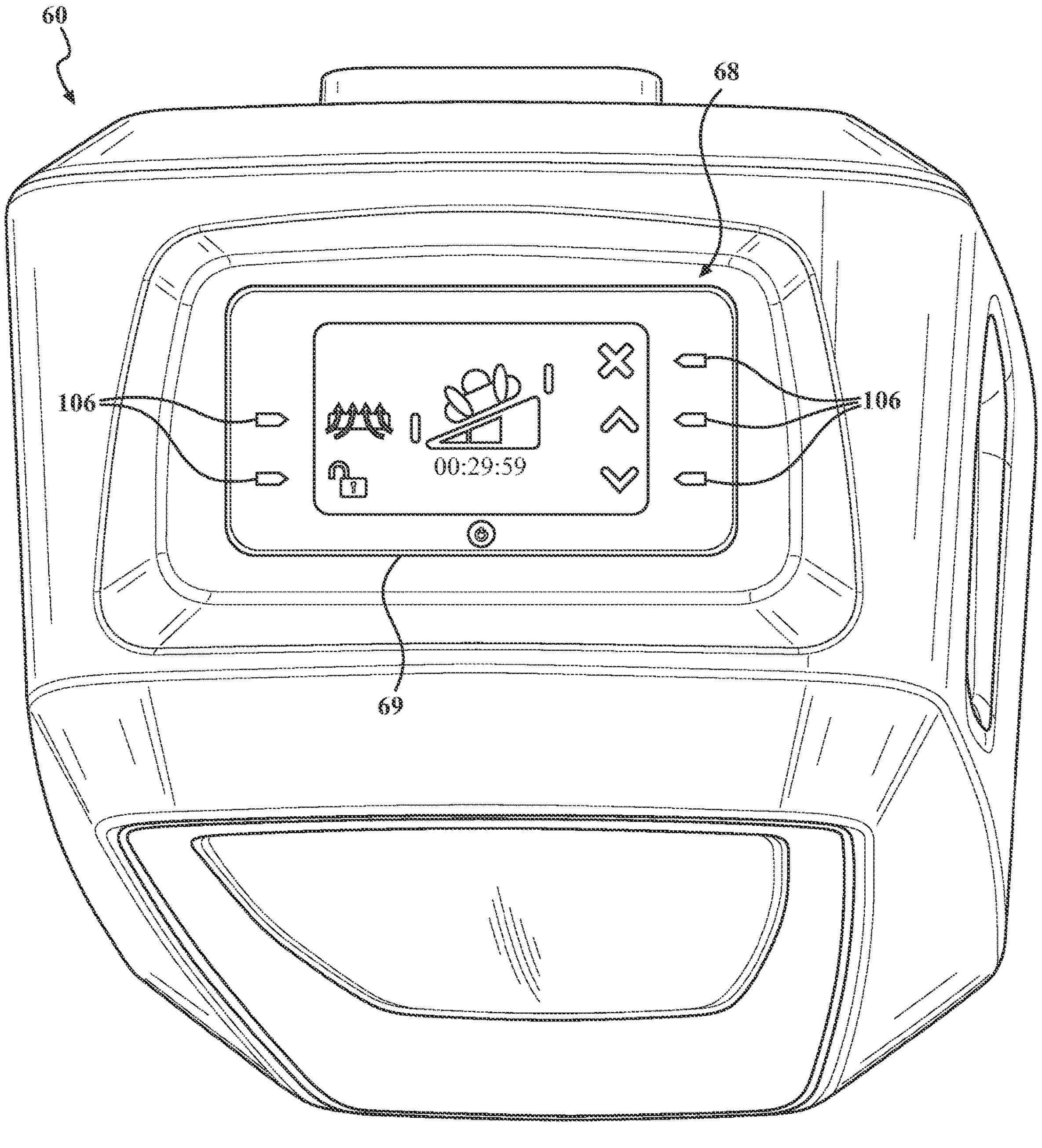
Figure 26:
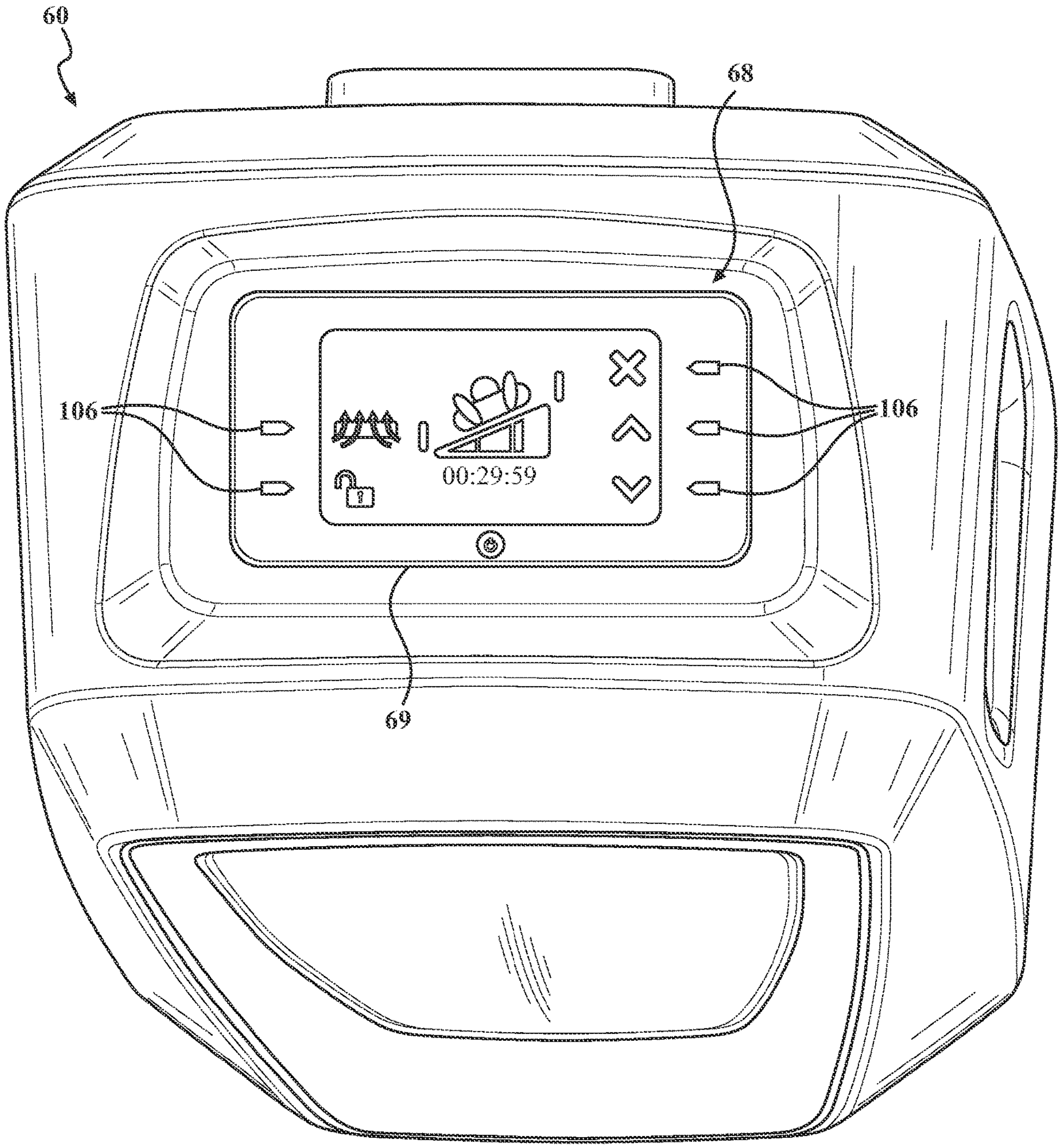

Referring to FIG. 22, once the user has selected the desired duration, the user interface 68 graphically illustrates to the user that the side rails of the patient support apparatus 30 first need to be raised. This can further be instructed by virtue of an animation of the side rails on the display 69, in which the side rails rise (compare FIGS. 21 and 22). Additionally, the graphically represented side rails may change color on the display once raised, such as changing from yellow, orange, or red, or shades thereof to green or blue, or shades thereof.

Referring to FIGS. 23 through 26, the user may further be able to adjust a turn angle to which the patient is turned during turn assist therapy by increasing the pressure in the turn bladders (not shown). For example, the user can actuate the user-selectable buttons 106 associated with increasing or decreasing the pressure (see arrows). As the pressure is increased, the controller 66 is configured to generate and output graphical images illustrating the increase or decrease in pressure, such as by graphically "filling" the bladder shown when increasing and graphically "draining" the bladder when decreasing (compare FIGS. 23-26). When the user-selectable buttons 106 associated with increasing or decreasing the turn angle are actuated by the user, corresponding input signals are received by the controller 66 and the controller then commands operation of the fluid supply device 64 through one or more command signals. The fluid supply device 64 can be stopped at any turn angle and fine-tuned allowing any size patient to reach, for example, up to a 30 degree turn angle, up to a 350 pound patient, or the user may set the turn bladder to any lesser angle as desired by the user.

Figure 27:
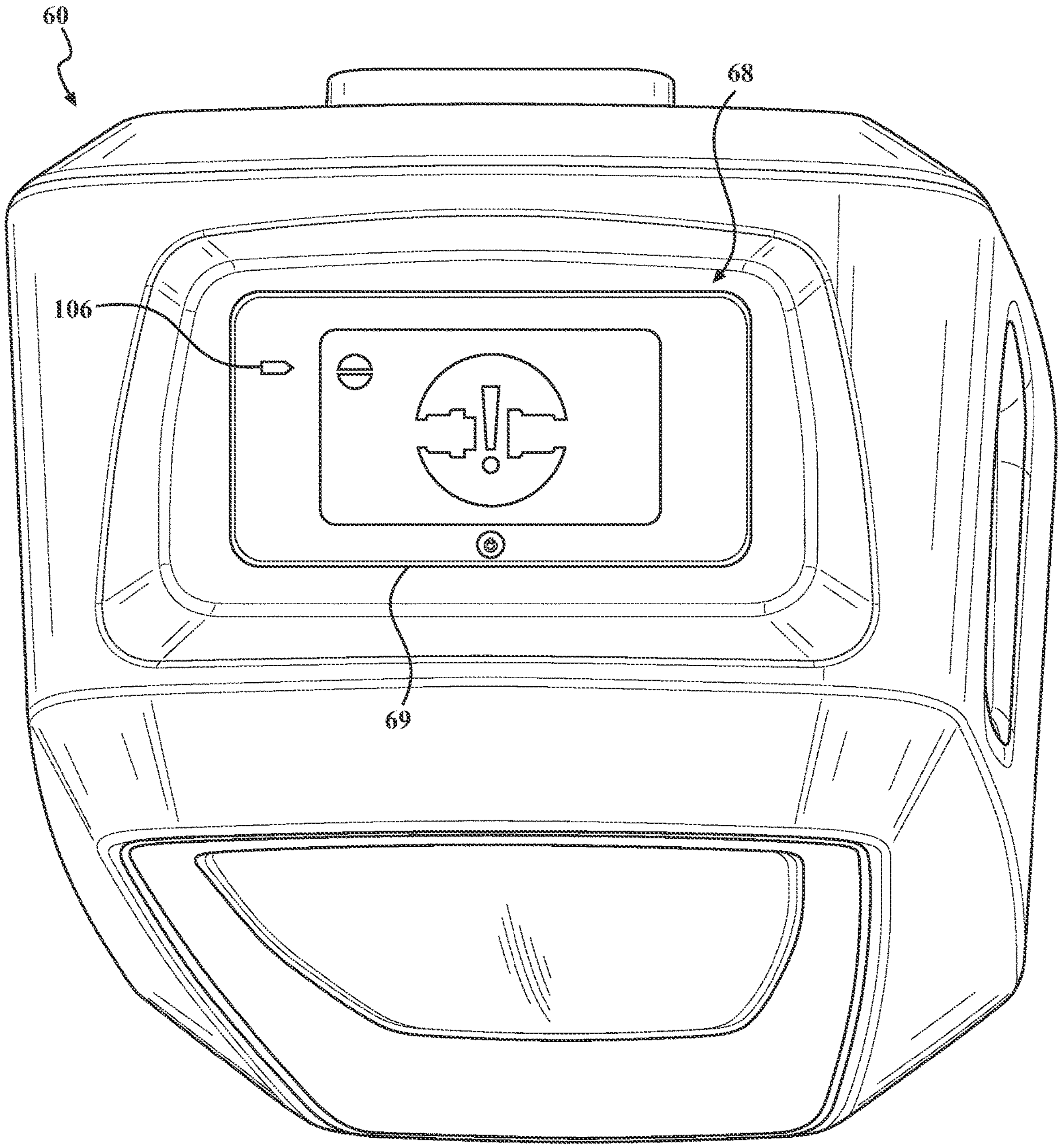
Figure 28:
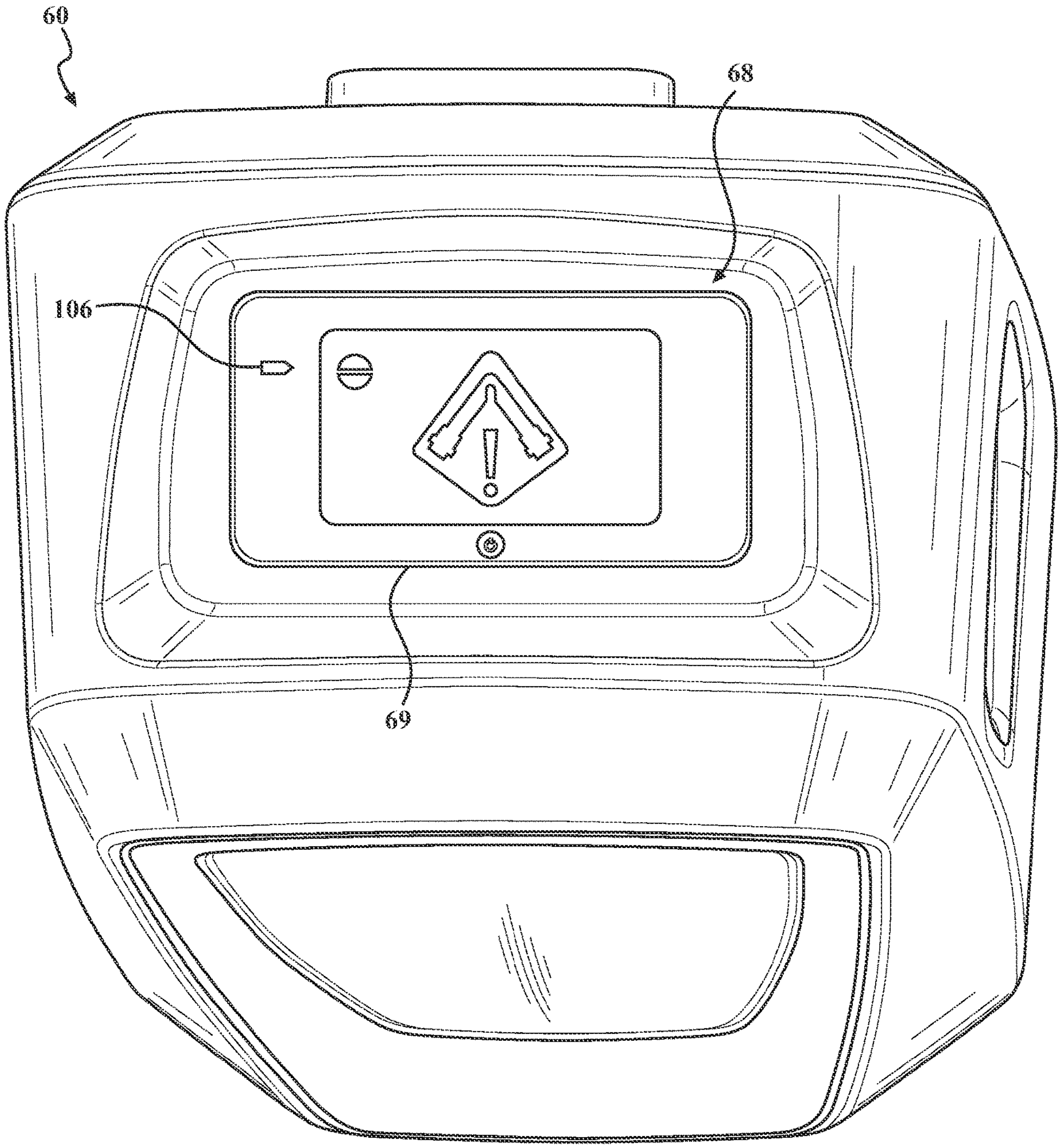

FIGS. 27 and 28 illustrate graphical warnings generated and output by the controller 66 to indicate either that the fluid supply line 84 is not properly connected between the fluid source 60 and the therapy device (FIG. 27) or that one or more lines are kinked (FIG. 28). The controller 66 is configured to detect these conditions via the sensors S previously described. If the fluid supply line 84 is not properly connected, then one or more of the sensors S will detect that the pressure is not increasing in a manner consistent with being properly connected and the controller 66 will respond with the warning of FIG. 27. If, instead, one or more of the sensors S detect spikes in pressure consistent with one or more supply lines/conduits being kinked, then the controller 66 will respond with the warning of FIG. 28.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A fluid source for supplying fluid to a therapy device, the fluid source comprising:

a housing;

a fluid supply device disposed within the housing;

a user interface operatively coupled to the housing to enable a user to provide input to operate the fluid supply device; and a hanger assembly operatively coupled to the housing, the hanger assembly comprising a hanger pivotable from a stowed position, in which the hanger is disposed adjacent to the housing, to a plurality of discrete extended positions, in which the hanger extends away from the housing at varying distances to accommodate hanging the fluid source on different support structures.

2. The fluid source of claim 1, wherein the hanger assembly includes a detent mechanism coupled to the hanger, with the detent mechanism comprising a first detent element and a second detent element, the first detent element being coupled to the hanger to rotate with the hanger relative to the second detent element from the stowed position to each of the plurality of discrete extended positions.

3. The fluid source of claim 2, wherein the hanger comprises a rotatable shaft and the second detent element is slidably coupled to the hanger to slide along the rotatable shaft as the rotatable shaft of the hanger and the first detent element rotate together relative to the second detent element.

4. The fluid source of claim 3, wherein the second detent element comprises an abutment shaped to abut the housing to prevent rotation of the second detent element relative to the housing.

5. The fluid source of claim 2, wherein the first detent element comprises a first plurality of teeth and the second detent element comprises a second plurality of teeth shaped to mate with the first plurality of teeth in each of the plurality of discrete extended positions.

6. The fluid source of claim 5, wherein the detent mechanism comprises a biasing device operatively engaging the second detent element to bias the second plurality of teeth into mating engagement with the first plurality of teeth at each of the plurality of discrete extended positions.

7. The fluid source of claim 1, comprising a second hanger movable from a stowed position, in which the second hanger is disposed adjacent to the housing, to a plurality of discrete extended positions, in which the second hanger extends away from the housing at varying distances to accommodate hanging the fluid source on the different support structures.

* * * * *